US010853067B2

(12) United States Patent
Henry et al.

(10) Patent No.: US 10,853,067 B2
(45) Date of Patent: Dec. 1, 2020

(54) COMPUTER PROCESSOR FOR HIGHER PRECISION COMPUTATIONS USING A MIXED-PRECISION DECOMPOSITION OF OPERATIONS

(71) Applicant: INTEL CORPORATION, Santa Clara, CA (US)

(72) Inventors: Gregory Henry, Hillsboro, OR (US); Alexander Heinecke, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 67 days.

(21) Appl. No.: 16/144,964

(22) Filed: Sep. 27, 2018

(65) Prior Publication Data
US 2019/0042244 A1 Feb. 7, 2019

(51) Int. Cl.
G06F 9/30 (2018.01)
G06F 7/483 (2006.01)
(Continued)

(52) U.S. Cl.
CPC .......... G06F 9/30014 (2013.01); G06F 7/483 (2013.01); G06F 7/4876 (2013.01);
(Continued)

(58) Field of Classification Search
CPC .......... G06F 7/48; G06F 7/4823; G06F 7/483; G06F 7/4876; G06F 7/57; G06F 7/5443;
(Continued)

(56) References Cited

U.S. PATENT DOCUMENTS 3,389,379 A * 6/1968 Erickson ............. G06F 9/30025
341/75
5,317,526 A 5/1994 Urano et al.
(Continued)

FOREIGN PATENT DOCUMENTS

| CN | 110337635 A | 10/2019 |
|---|---|---|
| EP | 3602277 A1 | 2/2020 |
| WO | 2018/174925 A1 | 9/2018 |

OTHER PUBLICATIONS

L Null et al., The Essentials of Computer Organization and Architecture, 4th edition, 2015 (Year: 2015).*
(Continued)

Primary Examiner — Andrew Caldwell
Assistant Examiner — Emily E Larocque
(74) Attorney, Agent, or Firm — Nicholson De Vos Webster & Elliott LLP

(57) ABSTRACT

Embodiments detailed herein relate to arithmetic operations of float-point values. An exemplary processor includes decoding circuitry to decode an instruction, where the instruction specifies locations of a plurality of operands, values of which being in a floating-point format. The exemplary processor further includes execution circuitry to execute the decoded instruction, where the execution includes to: convert the values for each operand, each value being converted into a plurality of lower precision values, where an exponent is to be stored for each operand; perform arithmetic operations among lower precision values converted from values for the plurality of the operands; and generate a floating-point value by converting a resulting value from the arithmetic operations into the floating-point format and store the floating-point value.

20 Claims, 29 Drawing Sheets

(51) Int. Cl.
*G06F 7/487* (2006.01)
*G06F 7/53* (2006.01)

(52) U.S. Cl.
CPC ........ *G06F 7/5324* (2013.01); *G06F 9/30025* (2013.01); *G06F 9/30145* (2013.01)

(58) Field of Classification Search
CPC .. G06F 9/30014; G06F 9/30145; H03M 7/24; G06N 3/063
See application file for complete search history.

(56) References Cited

U.S. PATENT DOCUMENTS

| | | | | |
|---|---|---|---|---|
| 5,995,122 | A * | 11/1999 | Hsieh | G06T 1/20 345/561 |
| 6,029,243 | A * | 2/2000 | Pontius | G06F 7/483 708/495 |
| 6,108,772 | A * | 8/2000 | Sharangpani | G06F 7/483 708/500 |
| 6,925,553 | B2 * | 8/2005 | Roussel | G06F 9/30014 712/245 |
| 8,655,937 | B1 | 2/2014 | Vanderspek | |
| 9,128,697 | B1 | 9/2015 | Potter et al. | |
| 2012/0124115 | A1* | 5/2012 | Ollmann | G06F 7/483 708/204 |
| 2017/0293470 | A1 | 10/2017 | Wang et al. | |
| 2019/0228293 | A1* | 7/2019 | Imber | G06F 7/49915 |
| 2019/0294413 | A1* | 9/2019 | Vantrease | G06F 7/5443 |
| 2019/0340499 | A1* | 11/2019 | Burger | G06N 3/0454 |

OTHER PUBLICATIONS

E. Quinnell et al, Floating-point fused multiply add architectures, IEEE 2007 (Year: 2007).*

European Search Report and Written Opinion, EP App. No. 19182449.9, dated Dec. 5, 2019, 8 pages.

Kahan, W., "Lecture Notes on the Status of IEEE Standard 754 for Binary Floating-Point Arithmetic", Work in Progress: Lecture Notes on the Status of IEEE 754, May 31, 1996, 30 pages.

Whitehead, Nathan, et al., "Precision & Performance: Floating Point and IEEE 754 Compliance for NVIDIA GPUs", NVIDIA, 2011, 7 pages.

Quinnell, Eric Charles, "Floating-Point Fused Multiply-Add Architectures", Dissertation Presented to the Faculty of the Graduate School of the University of Texas at Austin in Partial Fulfillment of the Requirements for the Degree of Doctor of Philosophy, May 2007, 163 pages.

PCT International Application No. PCT/US2017/040534, entitled "Systems, Methods, and Apparatuses for DOT Product Operations", filed Jul. 1, 2017, 112 pages.

U.S. Appl. No. 16/486,960, filed Aug. 19, 2019, 109 pages.

* cited by examiner

//Example 1: converting fp32 x in [minval,maxval] into uint8x3 double v, scale = (maxval-minval) / (2^{8*3} - 1);
uint32_t num, first_8_bits=255, second_8_bits=65280, third_8_bits=16711680;
v = x - minval ; // make the value x nonnegative to map better with unsigned
int num = (uint32_t)(v / scale);
q1 = (uint8_t)(num & first_8_bits);
q2 = (uint8_t)((num & second_8_bits)>>8);
q3 = (uint8_t)((num & third_8_bits)>>16);

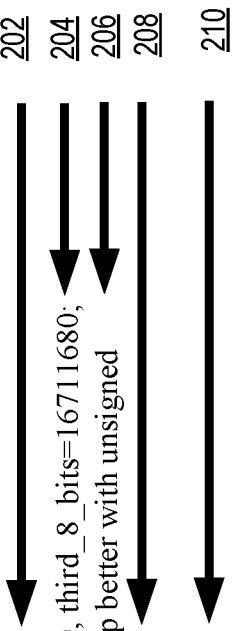

FIG. 2A

//Example 2: converting fp32 x in [minval,maxval] into uint16x2 double v, scale= (maxval-minval)/(2^{16*2}-1);
uint32_t num, first_16_bits=65536, second_16_bits=4294901760;
v = x - minval; // make the value x nonnegative to map better with unsigned int
num = (uint32_t)(v / scale);
q1 = (uint16_t)(num & first_16_bits);
q2 = (uint16_t)(num & second_16_bits) >> 16;

FIG. 2B

//Example 3: converting fp32 x in [minval,maxval] into int8x3

```
double v, scale = (maxval-minval) / (2^{8*3} - 1);
uint32_t num, first_8_bits=255, second_8_bits=65280, third_8_bits=16711680;
v= x - minval ; // make the value v nonnegative to map better with unsigned int
num = (uint32_t)(v / scale);
q1 = (int8_t)((num & first_8_bits) - 128);
q2 = (int8_t)(((num & second_8_bits)>>8) - 128);
q3 = (int8_t)(((num & third_8_bits)>>16) - 128);
```

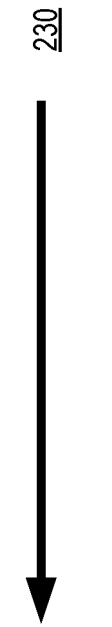

//Example 4: converting fp32 x in [minval,maxval] into uint8x4

```
double v, scale = (maxval-minval) / (2^{8*4} - 1);
uint32_t num, first_8_bits=255, second_8_bits=65280, third_8_bits=16711680;
v= x - minval ; // make the value x nonnegative to map better with unsigned
int num = (uint32_t)(v / scale);
q1 = (uint8_t)(num & first_8_bits);
q2 = (uint8_t)((num & second_8_bits)>>8);
q3 = (uint8_t)((num & third_8_bits)>>16);
q4 = (uint8_t)(num >> 24);
```

FIG. 2D

//Example 5: Converting int8x4 (q1,q2,q3,q4) back into a fp32 value x in the range [minval,maxval]

double scale = (maxval-minval) / (2^{8*4} - 1);
uint32_t num;
num = (q1+128) + ((q2+128)<<8) + ((q3+128)<<16) + ((q4+128)<<24);  240
x = scale*num + minval; // re-adjust to put the value in the right range  242

FIG. 2E

//Example 6: converting fp32 (float) x into a pair of bfloat16s (b1,b2)

b1 = bfl(x);   502
float tmp = x - (float)b1;   504
b2 = bfl(tmp)   506

FIG. 5A

//Example 7: converting a pair of bfloat16s (b1,b2) into a float (fp32) x x = (float)b1 + (float) b2;   510

FIG. 5B

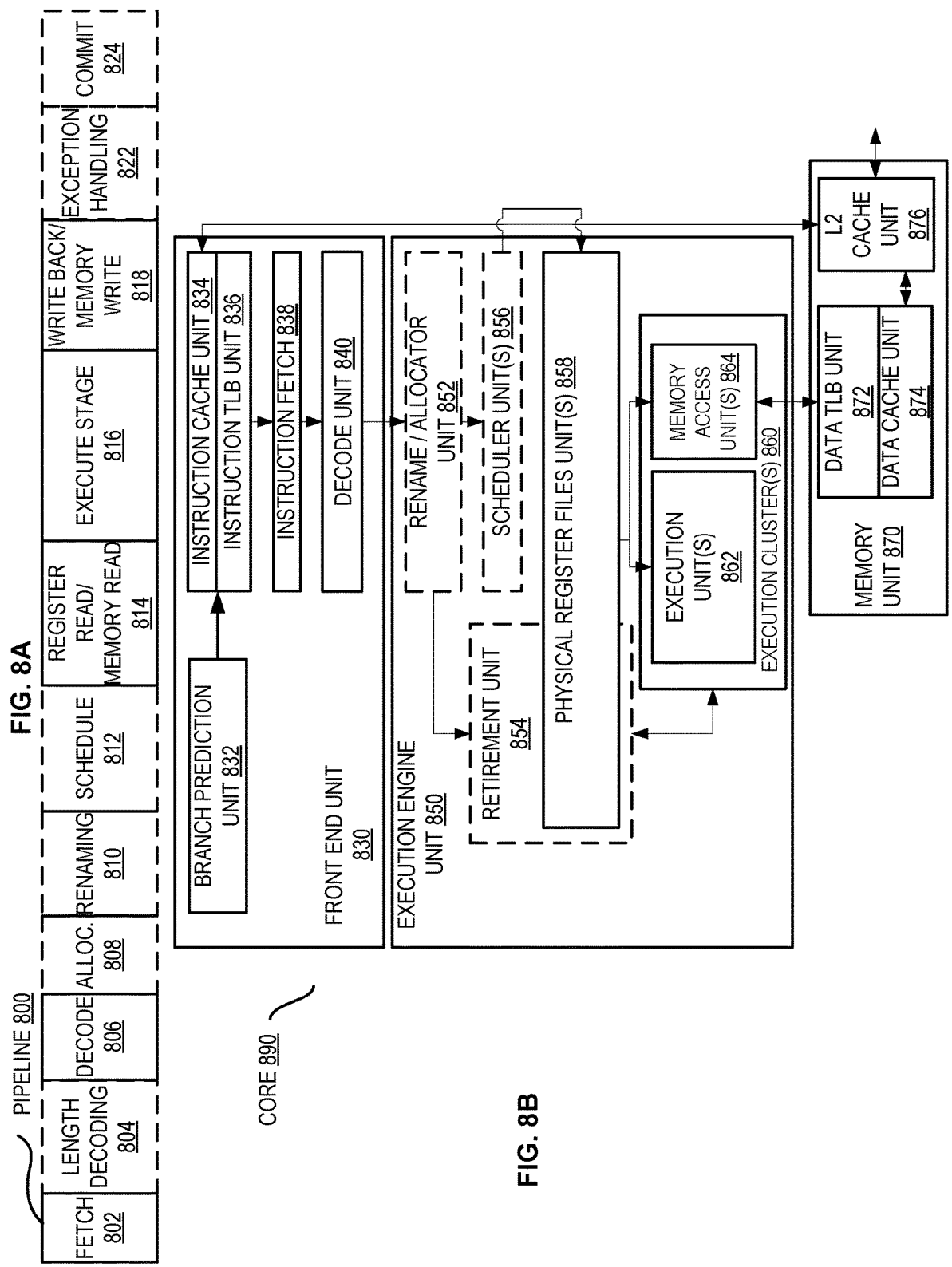

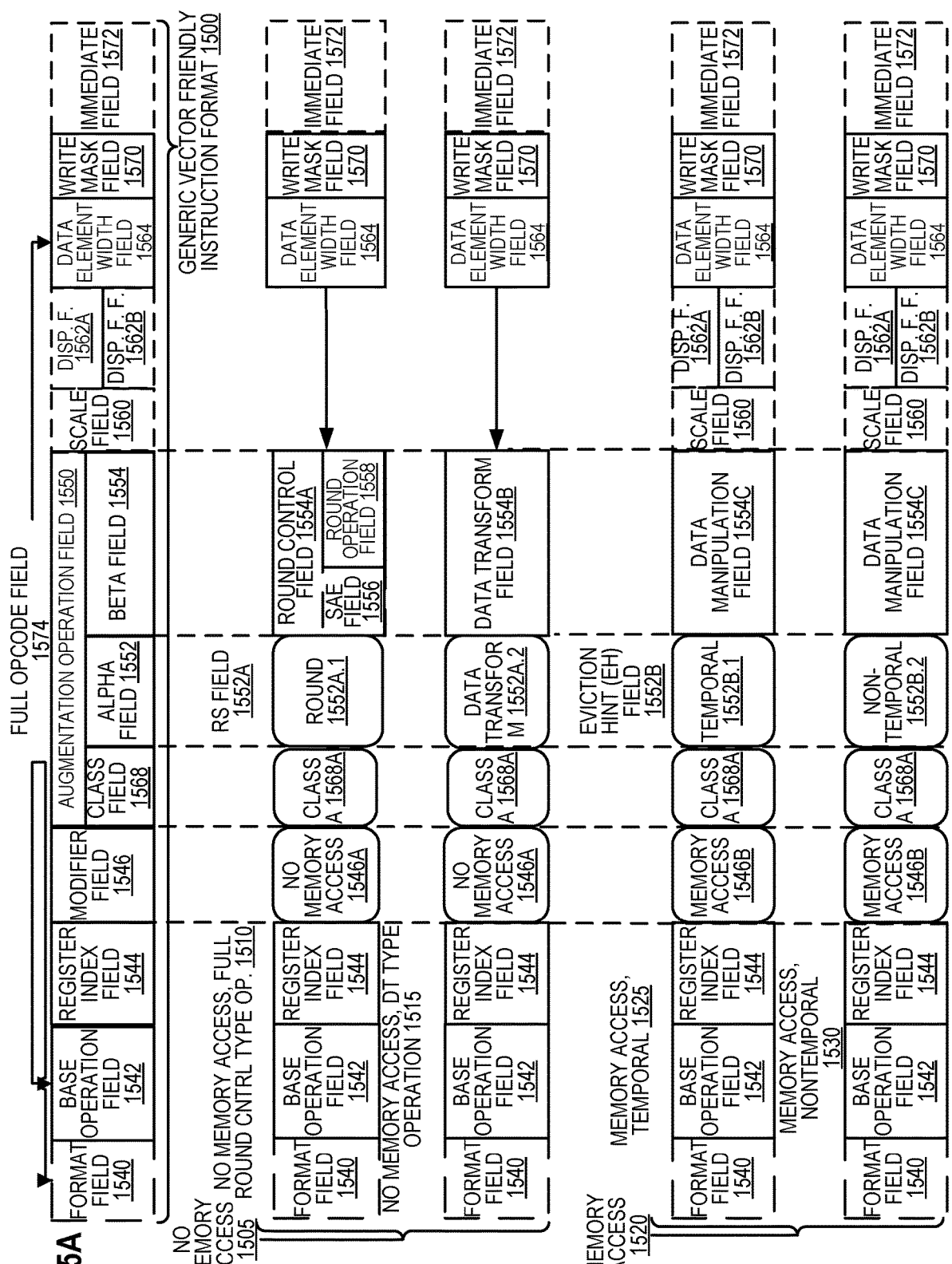

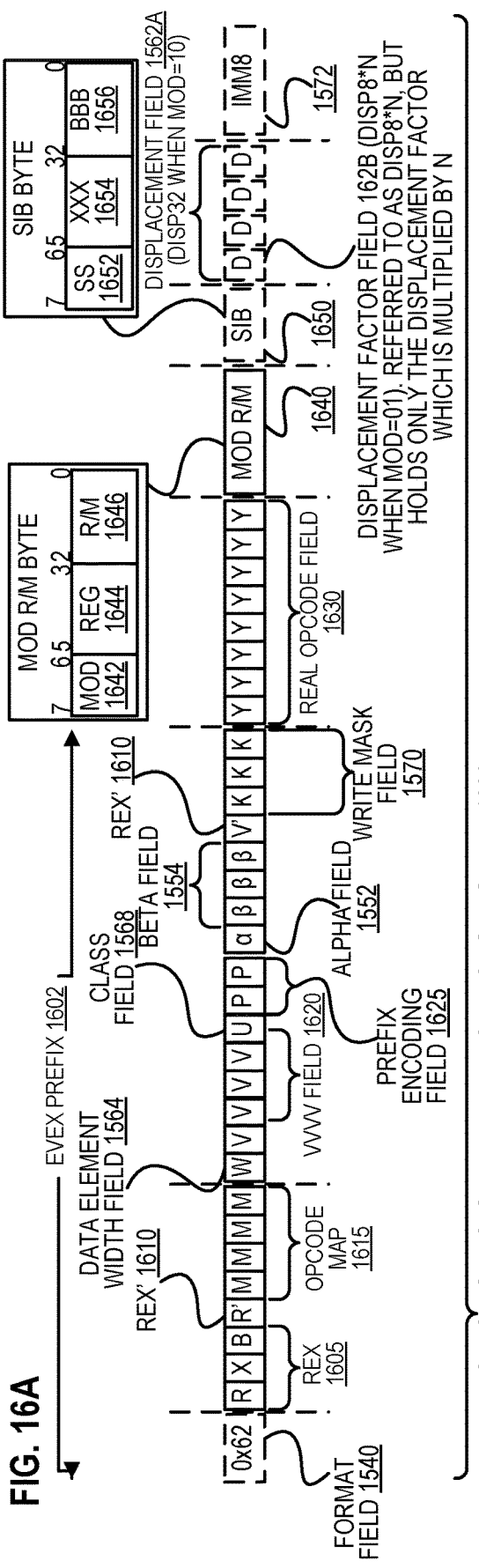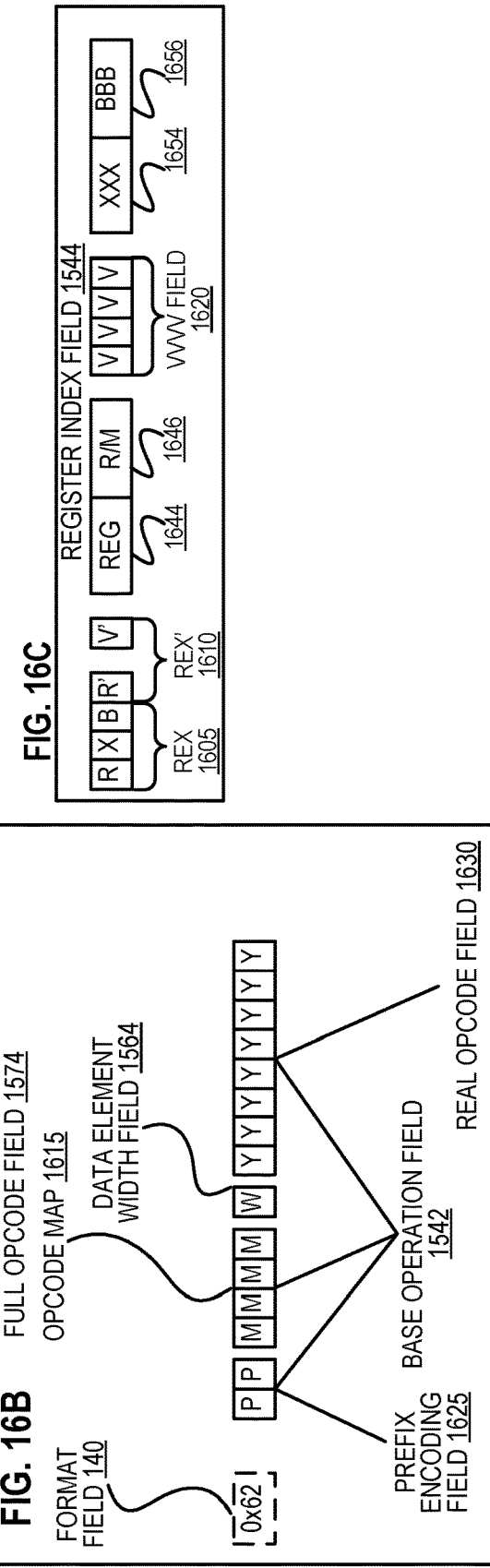

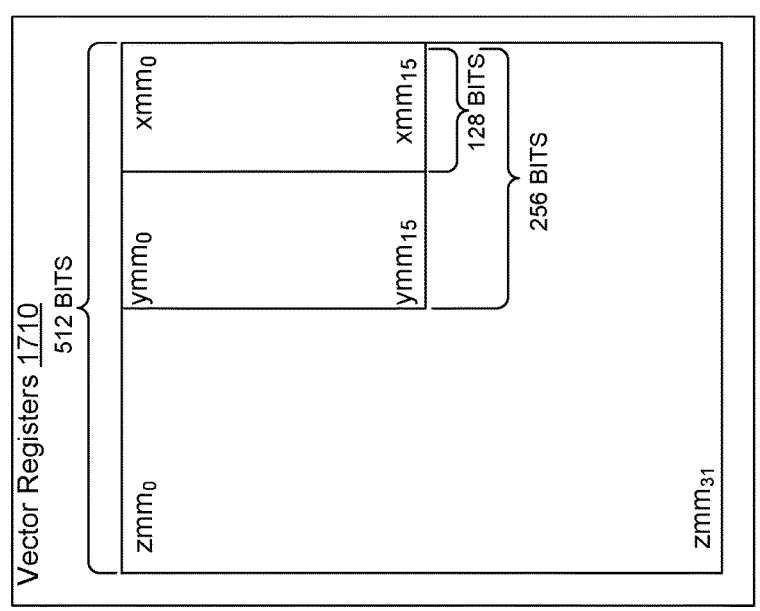
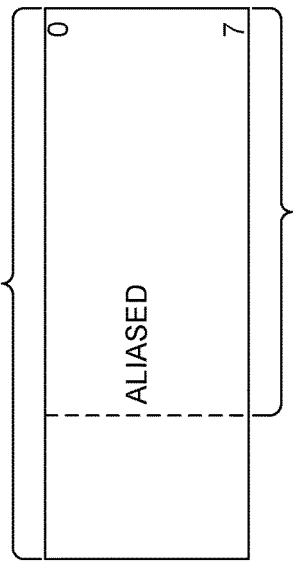
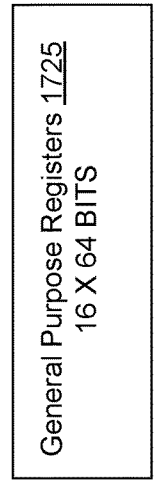
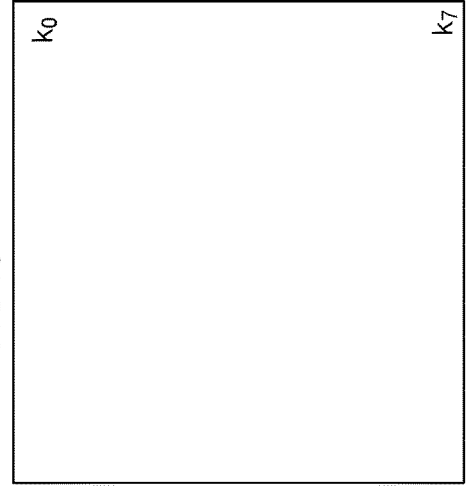
FIG. 17

ACCUMULATOR 2X INPUT SIZES 2601

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 2603

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 2605

| SOURCES | BITS | ACCUMULATOR | BITS |
|---|---|---|---|
| BYTE | 8 | INT64/DPFP | 64 |

FIG. 26

COMPUTER PROCESSOR FOR HIGHER PRECISION COMPUTATIONS USING A MIXED-PRECISION DECOMPOSITION OF OPERATIONS

TECHNICAL FIELD

Embodiments of the invention relate to the field of computer processor architecture; and more specifically, to precision conversion of values for arithmetic operations within a computer processor architecture.

BACKGROUND ART

Matrices, vectors, and other multi-dimensional data sets are increasingly important in many computing tasks such as machine learning and other bulk data processing. Performing arithmetic operations on floating-point data elements in these multi-dimensional data sets can be resource intensive and/or time consuming in computing.

BRIEF DESCRIPTION OF THE DRAWINGS

The invention may best be understood by referring to the following description and accompanying drawings that are used to show embodiments of the invention. In the drawings:

FIG. 2A shows the pseudo code to convert a FP32 value into three unsigned 8-bit integers per one embodiment of the invention.

FIG. 2B shows the pseudo code to convert a FP32 value into two unsigned 16-bit integers per one embodiment of the invention.

FIG. 2C shows the pseudo code to convert a FP32 value into three signed 8-bit integers per one embodiment of the invention.

FIG. 2D shows the pseudo code to convert a FP32 value into four unsigned 8-bit integers per one embodiment of the invention.

FIG. 2E shows the pseudo code to reconstruct a FP32 value from four signed 8-bit integers per one embodiment of the invention.

FIG. 5A shows the pseudo code to convert a FP32 value into two bfloat16 values per one embodiment of the invention.

FIG. 5B shows the pseudo code to construct a FP32 value from two bfloat16 values per one embodiment of the invention.

FIG. 8A is a block diagram showing both an exemplary in-order pipeline and an exemplary register renaming, out-of-order issue/execution pipeline according to embodiments of the invention.

FIG. 8B is a block diagram showing both an exemplary embodiment of an in-order architecture core and an exemplary register renaming, out-of-order issue/execution architecture core to be included in a processor according to embodiments of the invention.

FIGS. 15A and 15B are block diagrams showing a generic vector friendly instruction format and instruction templates thereof according to embodiments of the invention.

FIGS. 16A-D are block diagrams showing an exemplary specific vector friendly instruction format according to embodiments of the invention.

FIG. 17 is a block diagram of a register architecture according to one embodiment of the invention.

FIG. 26 shows power-of-two sized SIMD implementations wherein the accumulators use sizes that are larger than the inputs to the multipliers according to an embodiment.

DETAILED DESCRIPTION

Figure 1:
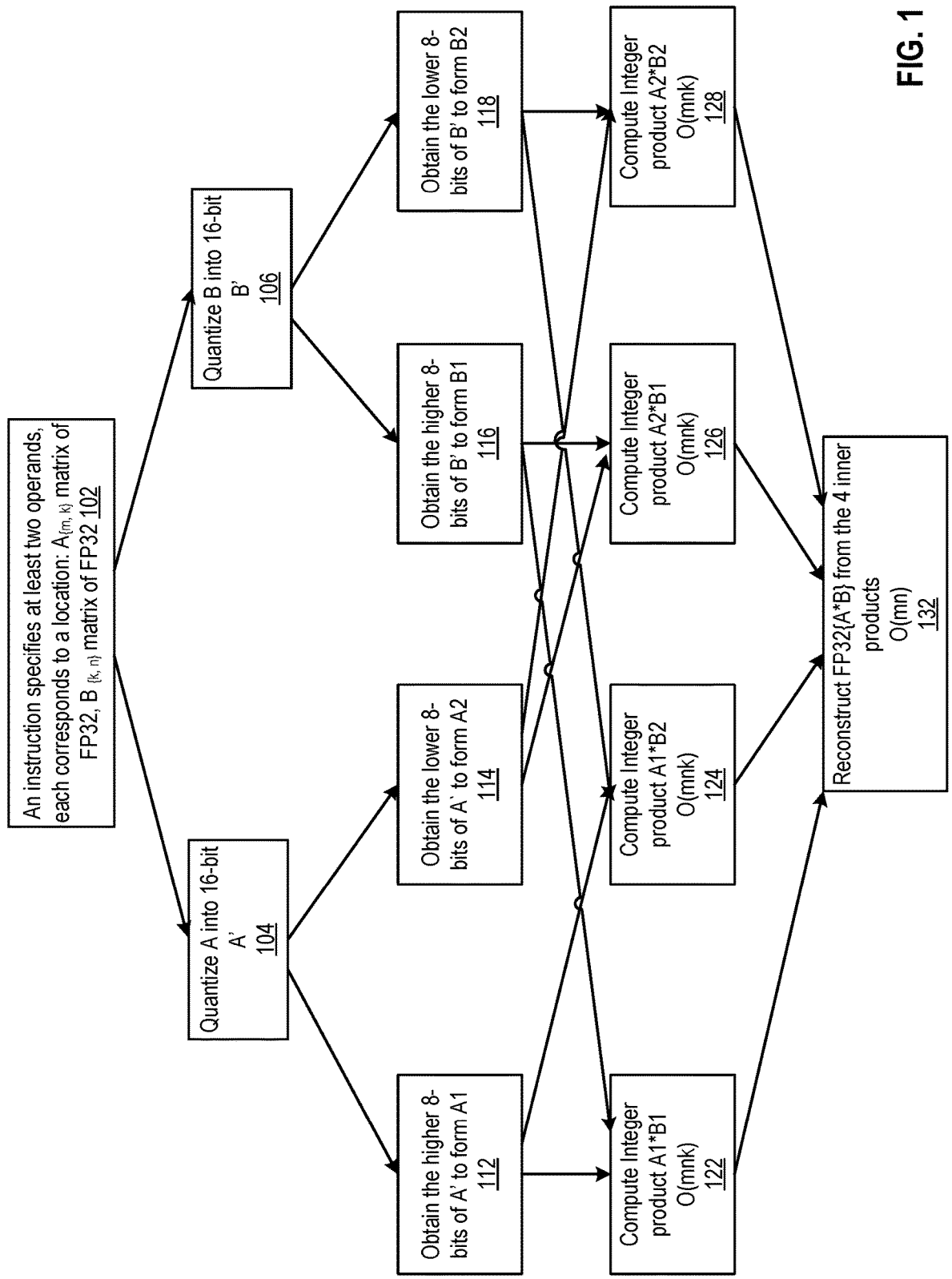
FIG. 1 shows operations of conversion from values in floating-point, each to multiple integers for arithmetic operations, and reconstruction of the resulting values from the arithmetic operations back to the floating-point per one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

Precision of Values

In computing, values are often represented in an integer format or a floating-point format. A value occupies a number of bits in computer memory. Depending on the ranges of values used in computing, different number of bits may be allocated. For example, an integer may take 8 bits, which has the range of −128 to 127 if it is a signed integer ($-2^7$ to $2^7-1$), and the range of 0 to 255 if it is an unsigned integer (0 to $2^8-1$). The 8-bit integer format is often shorthanded as int8, e.g., int8 for the signed integers and unit8 for the unsigned integers. Except for examples that specifically call out unsigned or signed, any time we write "int" it can be replaced with "uint." A number of integer formats are used in computing, and Table 1 shows a list of exemplary integer formats.

TABLE 1

Exemplary Integer Formats

| Integer Format | Common Shorthand | Bit length |
|---|---|---|
| nibble, semioctet | int4 | 4 |
| byte, octet | int8 | 8 |
| halfword, word, short | int16 | 16 |
| word, long, doubleword, longword, int | int32 | 32 |
| word, doubleword, longword, long long, quad, quadword, qword, int64 | int64 | 64 |
| octaword, double quadword | int128 | 128 |
| n-bit integer (general case) | not available | n |

The range of an integer format is $-2^{(n-1)}$ to $2^{(n-1)}-1$ for signed integers, and 0 to $2^n-1$ for unsigned integers. An integer format may represent an integer in the exact precision, but for real numbers other than integers, being irrational numbers or rational numbers excluding integers, values stored in an integer format is an approximation of the values. The approximation of the real numbers in the integer format is often not as precise as that of a floating-point format to represent values in the same range using the same number of bits.

A floating-point (FP) format uses formulaic representation of real numbers as an approximation to support a trade-off between range and precision. A value may be represented approximately to a fixed number of significant digits (the significand, which may also be referred to as "mantissa," and the two terms are used interchangeably) and scaled using an exponent in some fixed base (note that the exponent may also referred to as a scale, or exponential scale, and these terms are used interchangeably); the base for the scaling may be two, ten, or sixteen (or another integer). The value may be represented in the following form: significand×base$^{exponent}$, where the significand may be an integer or a floating-point value, base is an integer greater than or equal to two, and exponent is an integer. With a fixed number of digits, a floating-point system may be used to represent values of different orders of magnitude in computing. A number of floating-point formats are used in computing, and Table 2 shows a list of exemplary floating-point formats.

TABLE 2

Exemplary Floating-point Formats

| Floating-point Format | Common Shorthand | Exponent width | Significand precision (bits) | Sign bit |
|---|---|---|---|---|
| Bfloat16 floating-point format | Bfloat16 | 8 | 8 (7 explicitly stored) | 1 |
| half-precision floating-point format | Float16, FP16, binary16 | 5 | 11 (10 explicitly stored) | 1 |
| single-precision floating-point format | Float32, FP32, binary32 | 8 | 24 (23 explicitly stored) | 1 |
| double-precision floating-point format | Float64, FP64, binary64 | 11 | 53 (52 explicitly stored) | 1 |
| quadruple-precision floating-point format | Float128, FP128, binary128 | 15 | 113 (112 explicitly stored) | 1 |
| Octuple-precision floating-point format | Float256, FP256, binary256 | 19 | 237 (236 explicitly stored) | 1 |

In Table 2, the precision of the floating-point formats increases from the bfloat16 floating-point format to the octuple-precision floating-point format because more bits are used for the significand precision (from 8 bits in bfloat16 to 237 bits in the octuple-precision).

Within the exemplary floating-point formats in Table 2, bfloat16 is a relatively new floating-point format that seems to be gaining traction due to its ability to work well in machine learning (ML) and artificial intelligence (AI) algorithms Yet bfloat16 may have less accuracy than the single-precision floating-point format (FP32), because as shown in Table 2, FP32 values have 8 bits of exponent and 24 bits of significand (one implicit), whereas bfloat16 values have 8 bits of exponent and 8 bits of significand. The decreased significand size means that many values (but not all) can't be represented as accurately in the bfloat16 format than in the FP32 format.

Since dedicated circuitries/logic are built using the bfloat16 format (e.g., in machine learning), it is desirable to use the bfloat16 format to represent a higher precision value (e.g., the ones stored in FP32, FP64, FP128, or FP256 format) in computation and then run arithmetic operations using bfloat16, particularly in vector/matrix computation (e.g., the General Matrix-Matrix Multiplication, GEMM). Some embodiments of the invention combine multiple (K) bfloat16 values together to represent a higher precision floating-point values. Since the multiple bfloat16 values have 8×K significand precision bits, they may represent a single value within an arbitrarily higher precision value format by increasing the multiple K. Thus, embodiments of the invention may leverage existing bfloat16 hardware units (e.g., circuitries) that are specialized for bfloat16 arithmetic operations, and that can run one or more order of magnitudes faster than a classic floating-point hardware unit/circuit using FP32, FP64, FP128, or FP256 format. Running the bfloat16 arithmetic operations using the bfloat16 hardware units/circuits may approximate and/or exceed FP32/64/128/256 accuracy by the combination of the multiple bfloat16 values, and may additionally achieve a faster execution rate than the classic floating-point hardware units/circuits using FP32, FP64, FP128, or FP256 format.

In addition to bfloat16, machine learning (ML) and artificial intelligence (AI) also extensively use integer formats such as int4, int8, int16, int32, int64, and inte128. In ML and/or AI, a float-point value (e.g., one stored in FP32, FP64, FP128, or FP256 format) may be quantized to be stored in an integer format, and the quantized value in an integer format is then used for an ML and/or AI application (e.g., in a neural network). The quantization is helpful in the application because ML/AI based hardware often includes hardware units (e.g., circuitries) that are specialized for integer arithmetic operations, and that can run one or more order of magnitudes faster than a classic floating-point hardware unit/circuit using FP32, FP64, FP128, or FP256 format. Running the integer arithmetic operations using the integer hardware units/circuits may approximate and/or exceed FP32/64/128/256 accuracy by the combination of the multiple integer values, and may additionally achieve a faster execution rate than the classic floating-point hardware units/circuits using FP32, FP64, FP128, or FP256 format.

Converting a single floating-point value from FP32, FP64, FP128, or FP256 format to multiple values in bfloat16 format or integer formats such as int8 and int16 often results in the multiple values in a lower precision in each of the multiple values than the original floating-point value, because less bits are used to represent each of the multiple values (thus referred to as lower precision values). Yet faster hardware units/circuits for the bfloat16 and integer formats (e.g., one or more order of magnitudes faster than a classic floating-point hardware unit/circuit using FP32, FP64, FP128, or FP256 format) exist in some computer architecture, and the converted values may be used in multiple arithmetic operations (e.g., in vector or matrix arithmetic operations, the converted values are often used multiple times so that the additional cost (e.g., computing time and hardware/software resources) of conversion and reconstruction is spread over the multiple arithmetic operations, embodiments of the invention may result in faster overall arithmetic operation time (thus yielding higher throughput) as well as the approximately same or even better accuracy than the arithmetic operations without the conversion.

The examples provided in this disclosure herein below use conversions from FP32 to bfloat16, and from FP32 to int8. Obviously, the embodiments of the invention are not so limited, and each of the values in one floating-point format (e.g., a format in Table 2) may be converted (1) to multiple values in a lower precision float-point format (e.g., another format that has less significand bits in Table 2) or (2) to multiple integer values in an integer format (which are in lower precision, and which may be a format in Table 1 with a less bit length) using embodiment of the invention. Such conversion may achieve faster overall arithmetic operation time (thus yielding higher throughput) as well as the approximately same or even better accuracy than the arithmetic operations without the conversion.

The embodiments of the invention may implement new instructions for such conversion, and the instructions may be used in not only machine learning (ML) and artificial intelligence (AI), but also high-performance computing (HPC) application and other applications. Embodiments of the invention may leverage hardware circuitries (e.g., multiplier-accumulator (MAC) circuits, fused multiply add (FMA) circuits) that are dedicated to arithmetic operations (e.g., General Matrix-Matrix Multiplication (GEMM)) in particular data formats (e.g., bfloat16 or various integer formats). In addition to and/or in alternative of the faster overall arithmetic operation time as discussed, embodiments of the invention may adjust the accuracy of the arithmetic operation as explained in more details below. Note while the examples are given for matrix multiplication, embodiments of the invention may apply to other arithmetic operations (one or more of addition, subtraction, multiplication, and division) between 1D, 2D, 3D, or other multi-dimensional arrays such as matrix and matrix, matrix and vector, or vector and vector.

Conversion from Floating-points, Each One to Multiple Integers

An input floating-point value may be converted into multiple integers through quantization. Quantization of the input floating-point value adds extra needs for quantization support. Yet the quantization allows the resulting multiple integer values to use integer units, which may be executed one or more order of magnitudes faster than classic floating-point hardware units/circuits using FP32, FP64, FP128, or FP256 format in a computer processor.

In one embodiment, a computer processor may take an instruction, which specifies at least two operands, each includes parameters that are in a floating-point format. The parameters may correspond to an input of an array in one-dimension (1D), two-dimension (2D), three-dimension (3D), or any other dimensions. The 1D array may be referred to as a vector of N data elements, and the 2D array may be referred to as a matrix or a tile of M*N data elements (note that the terms "matrix" and "tile" are used interchangeably in this disclosure). The data elements are typically in a same floating-point format (e.g., one of FP32, FP64, FP128, or FP256 format). The instruction is for performing one or more arithmetic operations between the two operands, and the arithmetic operations may be one or more of addition, subtraction, multiplication, and division. Each of the floating-point values identified by the operands may be quantized into multiple integers and a shared exponent of the multiple integers may be stored within memory or a register (e.g., one within the physical register file (PRF) of a processor). The processor may execute a series of integer arithmetic operations and identify the final exponent, finally the execution result is converted back to floating point before storing it in the resulting 1D or 2D array.

The quantization to integers and conversion back to float-point values do not comply with the present Institute of Electrical and Electronics Engineers (IEEE) standards for value representation such as IEEE 754 standards. Yet the series of integer arithmetic operations may leverage integer arithmetic hardware units/circuits such as multiplier-accumulator (MAC) circuits (also referred to as multiply-add or MADD circuits), which are to perform integer multiply-accumulate operations. In one embodiment, an MAC circuit includes a fused multiply add (FMA) circuit. The MAC circuits may run one or more order of magnitudes faster in their integer arithmetic operations than classic floating-point hardware units/circuits using FP32, FP64, FP128, or FP256 format. The non-IEEE compliant computation provides comparable or more accurate than the floating-point arithmetic operations without the quantization and conversion in some embodiments.

FIG. 1 shows operations of conversion from values in floating-point, each to multiple integers for arithmetic operations, and reconstruction of the resulting values from the arithmetic operations back to the floating-point per one embodiment of the invention. At reference 102, an instruction is decoded. The instruction specifies at least two operands, each identifying to a location(e.g, memory, cache, or register) for an array, matrix $A_{\{m,k\}}$ of FP32 and matrix $B_{\{k,n\}}$ of FP32, respectively. The matrices A and B may be stored in registers, cache, or memory in embodiments of the invention.

The values in matrices A and B are then quantized at references 104 and 106. The quantization results in matrices A' and B', which contain 16-bit quantized values for corresponding value in matrices A and B. Each quantized value is then split into two parts: At references 112 and 116, the higher 8-bit values are obtained to form matrices A1 and B1; and at references 114 and 118, the lower 8-bit values are obtained to form matrices A2 and B2. Then integer arithmetic operations are performed at references 122 to 128. In this example, the integer arithmetic operations are product between the matrices. Other arithmetic operations (e.g., one or more of one or more of addition, subtraction, multiplication, and division) may be performed at references 122 to 128 as well. The product operations are performed four times: A1*B1, A1*B2, A2*B1, and A2*B2. The product operations may be performed in serial or parallel depending on implementation. The resulting integers from references 122 to 128 are then reconstructed and converted back into FP32 by de-quantizing at reference 132.

Note that the product operations as shown at references 122 to 128 may be accumulated to a bit length multiple times of the input values, so that the accuracy of the results is maintained. In this example, the two input int8 values (8 bits each) may be accumulated in minimally 16 bits (preferably 24 or more) as the arithmetic operation result, thus the accumulators storing the results of the product operations are in the bit width of at least 2*8=16 bits for each product result. The idea is that the accumulators to store the results of the arithmetic operations between the converted lower precision values are large enough so that the accuracy of the arithmetic operations is not lost in embodiments of the invention. The integer arithmetic operation hardware circuits (e.g., MAC and/or FMA circuits) implementing the accumulation/accumulators do not comply with the present IEEE standards, but the mixed-precision decomposition of operations allows embodiments of the invention to perform arithmetic operations with a higher precision.

One measurement of computing effort is computational complexity, which may be denoted in big O notation, $O(x)$, where x is the highest order of magnitude of the work. In this example, the processor performs the arithmetic operations four times, each integer computation has the computational complexity of $O(mnk)$. That is, the highest order of magnitude of the computation is one or more times of $m*n*k$ (k products for $m*n$ data elements). Then the processor performs the conversion back into FP32, which has the computational complexity of $O(mn)$ for floating-point computation. If the product were performed between matrices A and B without the quantization and reconstruction processes in reference 104-132, the floating-point computation between matrices A and B has the computational complexity of $O(mnk)$. Yet the integer computation of $O(mnk)$ can be ten times or more (i.e., one or more order of magnitudes) faster than the floating-point computation of $O(mnk)$. Thus, the operations shown in FIG. 1, even though executing the integer inner products four times more, can be more efficient than the floating-point product without the quantization and reconstruction processes.

Note that the values of the matrices in FIG. 1 are quantized and then split into two parts in this example. Embodiments of the invention include splitting a quantized value into more than two parts as following example shows. In some embodiments, each FP32 value (24 significand precision bits) is split into three int8 is preferable (3*8 bits=24 bits). In general, the number of split parts may depend on the desired accuracy of the approximation using the quantization of the float-point values.

A floating-point value may be quantized using as many bits as necessary to get the desired accuracy. For example, a value of 17.1 in FP32 may be quantized to an integer value 17 using int16 or even int8. Yet to achieve a higher accuracy, embodiments of the invention may quantize the value using two int16 values or four int8 values, both of which use 32 bits. The quantization may quantize the value into a larger integer using a smaller exponent. The following examples illustrate the quantization and splitting an original FP32 value into multiple integer values.

EXAMPLE 1

Converting a FP32 Value Into Three Unsigned Integers, Uint8

For the conversion, assume that the range of the values is within [Minval, Maxval]. For example, the range of the values of a data array may be [−19, 19], and the value of 17.1 in FP32 is to be quantized. FIG. 2A shows the pseudo code to convert a FP32 value into three unsigned 8-bit integers per one embodiment of the invention. At reference 202, the scale is determined, and it is based on the integer format (uint8) and the number of integers to be used (three). Thus, the scale is (Maxval−Minval)/($2^{\wedge}$(integer length*the number of integers)−1), which is $38/(2^{\wedge}(8*3)-1)=38/16,777,215=2.2649766*(10^{\wedge}(-6))$ in decimal. The scale may be stored in a register, a cache, or memory.

Three numbers are then set as masks to obtain the three parts of lower-precision values from the quantized FP32 value at reference 204. The first_8_bits will pick the first 8 bits only since 255 has all ones in binary (bits 0-7); the second_8_bits will pick the middle 8 bits since 65280 has all ones in bits 8-15 and zeros in bits 8-7; and the third_8_bits will pick the third 8 bits only since 16,711,680 has all ones in bits 16-23 and zeros in bits 0-15.

At reference 206, an intermediate value is obtained, v=17.1−(−19)=36.1. At reference 208, the intermediate value is quantized, where the quantized value num=uint32_t 36.1/scale=15,938,354. The quantized value is a binary with 24 bits: [11110011] [00110011] [00110010], where brackets are added to shows the division of three parts. At reference 210, the quantized intermediate value is separated into three parts using the masks defined at reference 204. For the second and third parts, the resulting values are bit shifted 8 and 16 bits to the right, so that they are 8-bit values such that q1=[00110010]; q2=[00110011]; q3=[11110011]. The three unsigned integers may then be used to do arithmetic operations with other unsigned integers resulting from quantizing another FP32 value. The arithmetic operations may use the integer arithmetic operation circuits such as multiplier-accumulator (MAC) circuits, where each 8-bit value is allocated to respective MAC circuit based on its part position, and the results of the computation are reconstructed as discussed herein above. While masks are used to obtain the three parts of the lower precision values in this example, one may also use other ways to obtain the lower precision values. For example, bit shifting and/or truncating may also be used to obtain the lower precision values. Embodiments of the invention cover various ways that the lower precision values are obtained/identified.

Note that the precision of the quantization is based on the value of the scale, and the smaller the scale is, the better approximation results from the quantization. The scale value is based on several factors: the range of values, and number of bits available. The smaller is the range, and/or the more bits are available for quantization, the smaller is the scale and the better is the approximation.

The value of the scale may be provided by an instruction to request the arithmetic operations. For example, the instruction may include, other the two or more operands each containing 1D, 2D array, 3D array, or other dimensional array of data elements, one or more operands that specify the ranges of the arrays. In alternative or in addition, the processor may scan the data elements of the arrays upon receiving the instruction and determine the ranges.

EXAMPLES 2-4

Converting a FP32 Value Into Different Numbers of Integers

Examples 2-4 provide more examples of the quantization of a FP32 value. FIG. 2B shows the pseudo code to convert a FP32 value into two unsigned 16-bit integers per one embodiment of the invention. The pseudo code is similar to the one in FIG. 2A, but the scale is smaller, and the two 16-bit values q1 and q2 use more bits than the three 8-bit values q1, q2, and q3, the quantization likely results in a better approximation of the one in FIG. 2A.

FIG. 2C shows the pseudo code to convert a FP32 value into three signed 8-bit integers per one embodiment of the invention. FIG. 2C is similar to FIG. 2A, and one difference is the generation of the three 8-bit values at reference 230, where the values of q1, q2, and q3 are subtracted of 128 ($2^7$) base on the range of the signed 8-bit integer (from the range of unsigned integers of [0, $2^8-1$] to the range of signed integers of [$-2^7$, $2^7-1$]).

FIG. 2D shows the pseudo code to convert a FP32 value into four unsigned 8-bit integers per one embodiment of the invention. FIG. 2D is similar to FIG. 2A, and one difference is that with 32 bits (8 bits per integer*4 integers=32) for the quantization, the scale is smaller, thus the quantization likely results in a better approximation of the one in FIG. 2A.

While FP32 is used in the examples in FIGS. 2A-2D, values in other floating-point formats such as FP64, FP128, or FP256 may be quantized using the similar pseudo code. For example, FP64 has 53 bits for its significand, by using seven 8-bit unsigned integers (uint8s), we may complete cover the precision of the FP64 significand. The scale is an even smaller value: scale=(maxval−minval)/($2^{(8*7)}-1$). In general, the number of bits available for quantization is at or over the bit length for the significand of the respective floating-point format. In some embodiments, it may be desirable to intentionally use a bit length less than the one for the significand of the respective floating-point format (e.g., to achieve a quality of service compromise—less accuracy that that the original floating-point format but much faster).

Note that when software routine is available and fast, quantization using embodiments of the invention may not be necessary. For example, one may quantize a FP128 value into an 8-long string of uint16s, but software double-double or software quad precision may operate faster than arithmetic operations using the 8-long string of uint16s. The determination of whether to quantization and using how many bits to quantize may depend on the available of hardware circuitry performing fast integer arithmetic operations and how much faster the hardware circuitry is. The magnitude of computation speed increase should compensate for the additional work required to perform the quantization and reconstruction as discussed herein.

EXAMPLE 5

Reconstructing a FP32 Value From Four Signed Integers

Once the multiple integer values from the quantization and split perform arithmetic operations, they are reconstructed to return a final result in the float-point format that the initial value was in. FIG. 2E shows the pseudo code to reconstruct a FP32 value from four signed 8-bit integers per one embodiment of the invention. The scale remains the same as another example of converting into four unsigned integers in FIG. 2D as the same number of bits (32 bits) are used for quantization and reconstruction, even though here the signed integers are used in FIG. 2E. The reconstructed intermediate value is num, which is obtained at reference 240 through adjusting the range based on the range of a signed 8-bit integer (int8), and then bit-shifting since the four signed integers from the arithmetic operations correspond to different bit positions of the final results. The intermediate value, which is an integer represented by the full 32 bits of the result of the four signed 8-bit accumulations, which may already be 32-bits, is then converted back to the FP32 value using the minimum value and the scale at reference 242.

Note that in some embodiments, each of the arithmetic operations on the lower precision int8 values may already be accumulated into a larger int type, such as int32 value. The int32 values are then combined to form the result for the arithmetic operations. Then the reconstruction to FP32 may be simply to convert the int32 values into a corresponding FP32 value (without the illustrated bit-shifting in FIG. 2E).

Adjustment of Workload and Accuracy: Floating-Point Into Integers

In the examples relating to FIG. 1, two matrices are split into two pair-terms and doing matrix-multiply with them give four times the amount of work over the integer operations shown in one of references 122-128. Yet because the arithmetic operations in integers can run significantly faster than the same arithmetic operations in floating-point in some computer architecture, performing the additional conversion and reconstruction may be more efficient than doing the arithmetic operations over the original floating-point values. Additionally, some of the integer operations may be skipped to make embodiments of the invention more efficient.

With different number of integers being used to convert a floating-point, different numbers of terms result from matrix operations between two matrices. For example, if two integers are used for splitting each data element of a matrix, four times of multiplications are performed for a matrix multiply (as shown in the references 122-128). If three integers are used, nine times of multiplication are performed, and if four integers are used, 16 times. Because integer arithmetic hardware circuits (e.g., MAC circuits) may be performed at precision (without any loss of accuracy from the arithmetic operations), the computation with the full workload can be very accurate (only losing accuracy at the quantization step) Yet if we sacrifice some accuracy in the arithmetic operations, we may skip some of the multiple times of workload.

For example, in FIG. 1, the quantization of A results in matrix A1 formed using the higher 8-bits and matrix A2 using the lower 8-bits, and the quantization of B results in matrix B1 formed using the higher 8-bits and matrix B2 using the lower 8-bits. The workload may be expressed as int8x2_4p, where "int8x" denotes int8 operations, "2" denotes each FP32 value is split into two int8 value, and "4p" denotes that four terms are included in the computation. Instead of the four times of workload with A1*B1, A1*B2, A2*B1, and A2*B2, we may skip the multiplication for the least significant portion, the multiplication between lower 8-bits, A2*B2. The workload may be shown as int8x2_3p (one term less than int8x2_4p, which includes A2*B2). Thus, instead of four times of workload, we can save about 25% workload by performing multiplication for the three more significant portions (at the expense of some accuracy loss).

For another example, the quantization of A may result in three matrices, A1 to A3, each formed using 8-bits from the most significant bits to the least significant (i.e., A1: bits 23-16; A2: bits 15-8; and A3: bits 7-0), and the quantization of B may also result in three matrices, B1 to B3, each formed using 8-bits from the most significant bits to the least significant (i.e., B1: bits 23-16; B2: bits 15-8; and B3: bits 7-0). The workload is nine times of one matrix multiplication: int8x3_9p, which is A1*B1+A1*B2+A1*B3+A2*B1+ A2*B2+A2*B3+A3*B1+A3*B2+A3*B3. Similarly, we may skip the multiplication for the least significant portion, the multiplication between the lowest 8-bits, A3*B3, and obtain int8x3_8p Additionally, if we like to further remove workload, we may remove the lesser one or more significant portions thus reducing the accuracy while increasing the computation speed or reducing computation resource usage. For example, we may drop the terms with the coefficients that add to 5 or more, thus we may additionally drop A2*B2 and A3*B2. To further increase the computation speed or reducing computation resource usage, we may further drop the terms with the coefficients that add to 4 or more: A1*B3, A2*B2, A3*B1. The more terms are dropped, the less accurate the resulting reconstructed floating-point values are in approximating the floating-point values without the quantization and reconstruction, but less workload is performed. Embodiments of the invention provide ways to adjust the workload and accuracy.

An application using the embodiments of the invention may determine one or more quality of service (QoS) requirements as to the accuracy of arithmetic operations, workload limitation, computation speed requirement, and a processor implementing embodiments of the invention may determine how to meet the QoS requirements. For example, the processor may determine (1) how many integers, (2) the bit length of each of the integers, (3) whether the integers are signed or unsigned, and/or (4) how many terms to run arithmetic operations with. The determination may be based on the received instruction. The instruction may specify, other the two or more operands each containing an array of data elements, one or more operands that specify one or more of (1) to (4). Note that the determination of (1) to (2) also contribute the computation of the scale discussed herein above relating to Example 1.

The determination by the processor may also be determined internally without the specification by the instruction in some embodiments. The processor may determine (1) to (4) based on the available computing resources (e.g., available circuitries, required bandwidth, and/or storage space in register/cache/memory for the required arithmetic operations). Note that the internal arithmetic operations including the conversion and reconstruction are invisible to an application using some embodiments of the invention.

Through the optional adjustment in some embodiments of the invention, an application can have more than the options discussed earlier: using floating-points in the arithmetic operations (which may be accurate but slow), using quantization to quantize each floating-point value into a single integer (which may be imprecise but fast), or using quantization to quantize each floating-point value into multiple integers, running integer arithmetic operations, and reconstructing back into floating-points (which may be fast and comparably accurate or even more accurate than the original floating-points). Embodiments of the invention provide another knob to adjust the workload to suit the QoS requirements of an application and/or make better usage of available computing resources of a processor.

Note that the quantized results in embodiments of the invention may be stored for out-of-order execution of instructions. For example, if values of a matrix A are quantized in a first instruction, the quantized results may be stored in a register in the PRF. When a subsequent second instruction also uses matrix A, the stored quantized results of matrix A may be obtained from the register and no repeated quantization is necessary.

Accuracy of the Floating-Point Into Integers Approach Compared to Previous Approaches As discussed herein above, without embodiments of the invention, one may run arithmetic operations in floating-point, which may be accurate but slow. One may also run the arithmetic operations in integers, where each floating-point value is quantized in a single integer (in contrast to quantizing using multiple integers in embodiments of the invention), which is less accurate but fast. Using embodiments of the invention, on the other hand, may provide both accuracy and speed or offer desired accuracy and speed compromise. Testing using pseudo-random values confirms the features of the embodiments of the invention.

Figure 3:
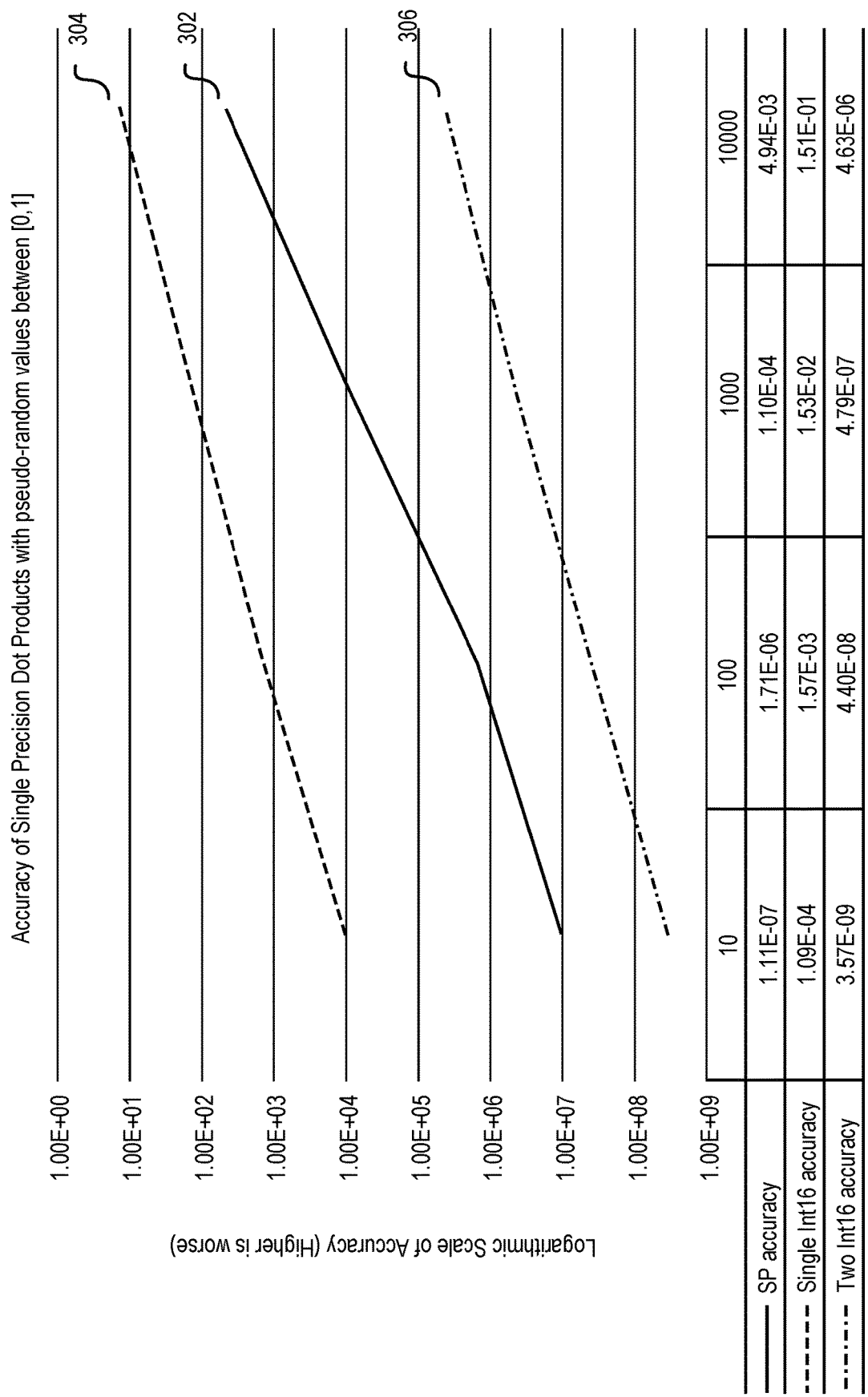
FIG. 3 shows data accuracy of an embodiment of the invention using floating-point into multiple integer approach comparing to previous approaches.

FIG. 3 shows data accuracy of an embodiment of the invention using floating-point into multiple integer approach comparing to previous approaches. The input data are single precision pseudo-random value between [0, 1]. The x-axis is the number of consecutive dot products performed (may be referred to as the problem size), and the y-axis is the accuracy of the resulting data. As one would expect, the more dot products in sequence are performed, the less accurate the resulting data will be, as each floating-point dot products may keep only limited number of bits. For example, FP32 has 24 bits for the significand precision, thus the dot product results of more than 24 bits are truncated thus results in a lower accuracy. When more results are accumulated on the axis from left to right, the less accurate the resulting data is shown.

The baseline accuracy of the dot products is shown at reference 302. The data is not quantized, and the dot products are performed using the input data at FP32. The accuracy of the dot products is better than what is shown at reference 304, where each data is quantized to a single int16 integer. That is not surprising, given the accuracy lost due to the quantization.

Reference 306 shows the accuracy of the dot products using an embodiment of the invention, where each value is quantized into two int16 integers. The accuracy of the embodiment of the invention is better not only comparing to the quantization to single values, but also comparing to no quantization. The improvement of the embodiment of the invention over the no quantization approach can be contributed to the intermediate errors in running FP32 dot products in the latter. In this example, the intermediate result of the first dot product is an input to the second dot product, and the intermediate result of the second dot product is an input to the third dot product. Each of the intermediate results of the dot product may truncate a number of bits thus lose some accuracy. In contrast, in the former, because the int16 integers are accumulated to a wider accumulation field (e.g., 64 bits a dot product in this example), the products are done without the loss of accuracy.

That is, some embodiments of the invention lose accurate at the initial quantization, but afterward the dot products are performed as integer dot products, and the intermediate results are integers and the integers are stored in the accumulators with a bit width long enough thus resulting in no accumulative loss of accuracy. In general, when the arithmetic operations include a series of operations, the intermediate results are stored with bit width long enough not to loss accuracy in some embodiments of the invention. For example, the first intermediate result of a first dot product of two int16 will be stored in an accumulation field of 32 bits (or longer), and the next intermediate result of the dot product between (1) the first intermediate result and (2) a third int16 value will be stored in an accumulation field of 48 bits (or longer). Since the chain arithmetic operations does not lose accuracy in these embodiments of the invention, the advantage of these embodiments of the invention is more apparent when large number of arithmetic operations are performed in sequence.

Conversion from Floating-Points, Each One to Multiple Lower Precision Floating-Points Similar to the conversion from floating-points to integers, embodiments of the invention include the conversion from floating-point values, each one converting to multiple lower precision floating-point values such as bfloat16.

Figure 4:
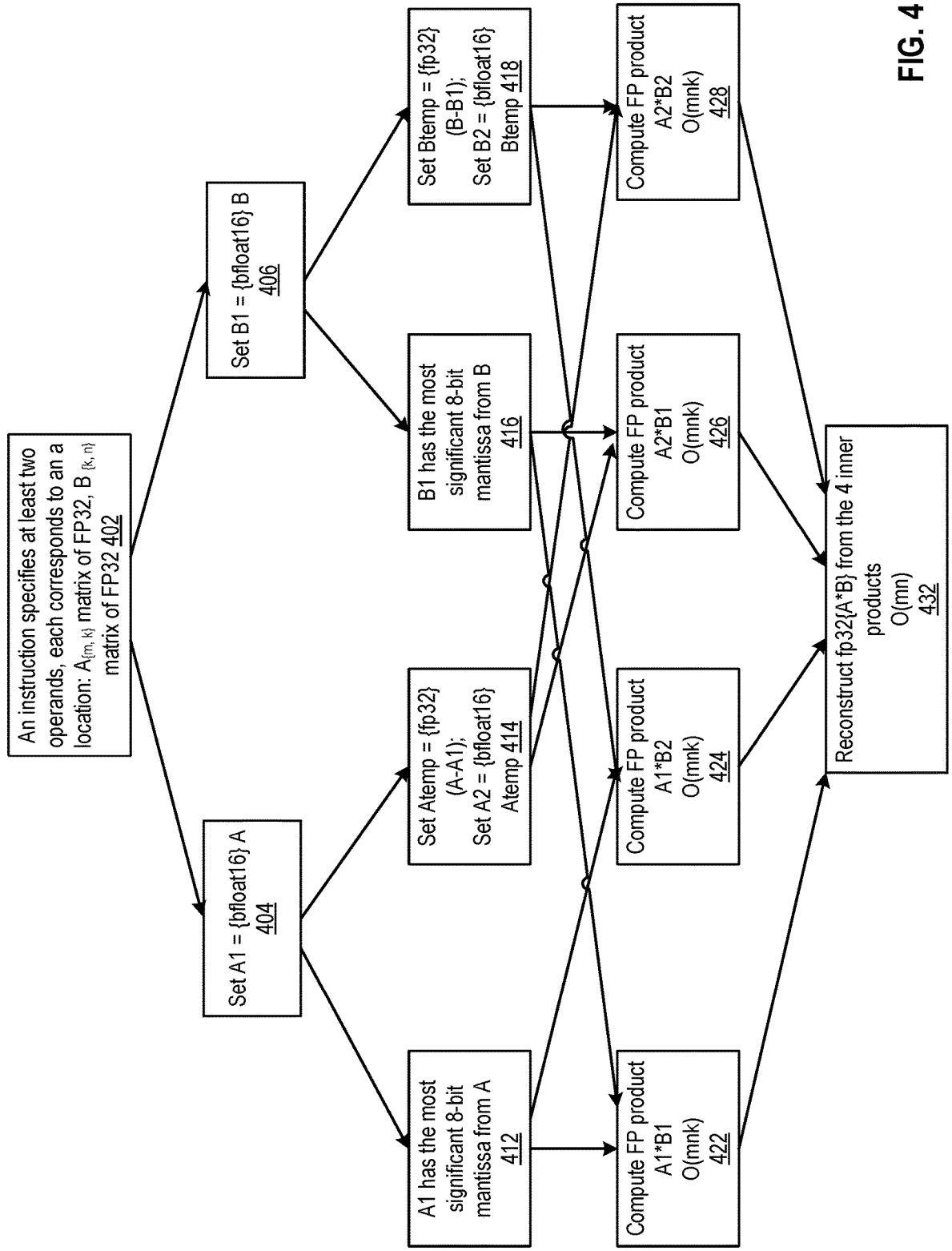
FIG. 4 shows operations of conversion from values in floating-point, each to multiple lower-precision floating-points for arithmetic operations, and reconstruction of the resulting values from the arithmetic operations back to the floating-point per one embodiment of the invention.

FIG. 4 shows operations of conversion from values in floating-point, each to multiple lower-precision floating-points for arithmetic operations, and reconstruction of the resulting values from the arithmetic operations back to the floating-point per one embodiment of the invention. The example converses values in FP32 to bfloat16, but of course other conversions from a higher precision floating-points to lower precision floating-points may use embodiments of the invention as well.

The operations starts at reference 402, and the operations are similar to the ones in reference 102 of FIG. 1 and thus the related discussion is not repeated here. Each of the values is then converted into two values in bfloat16 format. At references 404 and 406, the values in A and B in FP32 are approximated with values in bfloat16 format. Values of A1 and B1 (in bfloat16 format) are approximation of the ones of A and B (in FP32 format) and have lower precision than the ones of A and B because the bfloat16 has less mantissa bits than FP32 (8 bits vs. 24 bits). A1 and B1 has values represented by the most significant 8-bit mantissa of the ones in A and B as shown at references 412 and 416. At references 414 and 416, the reminders of A and B after subtracting A1 and B1 are approximated in bfloat16 format as A2 and B2, respectively. At references 422-428, bfloat16 floating-point products of the two matrix pairs are performed: A1*B1, A1*B2, A2*B1, and A2*B2. The product operations may be performed in serial or parallel depending on implementation. The resulting values from references 422 to 428 are then reconstructed and converted back into FP32 at reference 432.

Note that the product operations as shown at references 422 to 428 may be accumulated to a bit length multiple times of the input values, similar to the floating-point to integers approach discussed herein above. The accumulation bit width being wider than that of the input values makes the accumulation more precise than the case where the accumulation bit width being equal to that of the input values. In this example, the two input bfloat16 values (each with 8-bit significand precision) may accumulate into FP32 (which includes 16-bit significand precision) or more as the arithmetic operation result. For example, an accumulator may store the arithmetic operation result of the product as a FP32 value (with 24-bit significand precision). Thus, the results of references 422 to 428 may be in FP32 format already and the reconstruction may be a simple sum of the results of references 422 to 428 without the conversion back. The floating-point arithmetic operation hardware circuits (e.g., MAC and/or FMA circuits) implementing such accumulation/accumulators do not comply with the present IEEE standards, but the mixed-precision decomposition of operations allows embodiments of the invention to perform arithmetic operations with a higher precision.

Similar to the arithmetic operations in FIG. 1, the processor performs the arithmetic operations four times, each bfloat16 computation has the computational complexity of O(mnk) (k products for m×n data elements), then the processor performs the conversion back into FP32, which has the computational complexity of O(mnk) for FP32 floating-point computation. The computational complexity of using bfloat16 arithmetic operations, which have four times of O(mnk), appears to worse off than the computational complexity of using FP32 arithmetic operations, which is O(mnk). Yet the matrix arithmetic operations at references 422-428 may be performed using arithmetic circuitries specialized for bfloat16 arithmetic operations, and these float16 arithmetic circuitries may be run one or more order of magnitudes faster than a classic floating-point hardware unit/circuit using FP32. Thus, it may be more efficient by performing operations in FIG. 4 (including converting the FP32 values, each to multiple bfloat16 values, then using bfloat16 to run arithmetic operations, and then converting back to FP32 values) than performing arithmetic operations on the FP32 values.

Note that the conversion to the lower precision values, performance of the arithmetic operations and the reconstruction may not comply with Institute of Electrical and Electronics Engineers (IEEE) standards for value representation such as IEEE 754 standards. Yet the series of arithmetic operations on the lower precision values may leverage arithmetic hardware unit.

EXAMPLES 6 and 7

Converting a FP32 Value Into Multiple bfloat16 Values and Reconstructing a FP32 Values From Multiple bfloat16 Values In FIG. 4, each FP32 value within the matrices A and B is converted into two bfloat16 values. FIG. 5A shows the pseudo code to convert a FP32 value into two bfloat16 values per one embodiment of the invention. At reference 502, the FP32 value x is approximated using a bfloat16 value b1. At reference 504, the reminder of value x subtracted by b1 is set to a FP32 value tmp. Then at reference 506, the FP32 value tmp is approximated using a bfloat16 value b2. The two bfloat16 values, b1 and b2, are then used for the arithmetic operations between arrays (1D or 2D) as discussed relating to FIG. 4.

Once the arithmetic operations are completed, bfloat16 values may be returned. For example, the operations in references 422 to 428 may result in bfloat16 values (in some embodiments, the results may be in FP32 already, and the reconstruction does not require the conversion back as discussed herein above), and these bfloat16 values may be converted back to FP32 format. FIG. 5B shows the pseudo code to construct a FP32 value from two bfloat16 values per one embodiment of the invention. The construction of the FP32 value x is simply to add the two bfloat16 values stored in FP32 format as shown at reference 510.

Adjustment of Workload and Accuracy: Floating-Point Into Lower Precision Floating-Points While FIGS. 4-5 shows the conversion of one FP32 value into two bfloat16 values, obviously one may convert the FP32 value into more than two bfloat16 values. The difference of using different number of bfloat16 values per FP32 value is the computational complexity. Similar to the floating-point into multiple integer approach discussed herein, while splitting each FP32 value into two bfloat16 values results in four times of multiplications as shown in FIG. 4, splitting each FP32 value into three bfloat16 values results in nine times of multiplications, and splitting each FP32 value into four bfloat16 values results in 16 times of multiplications. Yet if we sacrifice some accuracy in the arithmetic operations, we may skip some of the multiple times of workload.

For example, we may refer the four inner-products of bfloat16 multiplications as the following:

bx2_4p: given by A1*B1+A1*B2+A2*B1+A2*B2 where "bx" denotes the bfloat16 operations, "2" denotes each FP32 value is split into two bfloat16 values, and "4p" denotes that four terms are included in the computation.

To reduce the workload, we may skip the lower-order term, A2*B2, so that the workload becomes the following:

bx2_3p: given by A1*B1+A1*B2+A2*B1

Similarly, the workload for splitting each FP32 value into three bfloat16 values may be shown as the following:

bx3_9p: given by A1*B1+A1*B2+A1*B3+A2*B1+
A2*B2+A2*B3+A3*B1+A3*B2+A3*B3

One may reduce the workload by skipping the lowest-order term, A3*B3, i.e., dropping the term(s) with the coefficients that add to 6:

bx3_8p: given by A1*B1+A1*B2+A1*B3+A2*B1+
A2*B2+A2*B3+A3*B1+A3*B2

The workload may be further reduced by dropping the additional terms with the coefficients that add to 5, A3*B2 and A2*B3 and resulting in bx3_6p. The process may continue. By dropping more terms, the workload is reduced, which may increase the computation speed and/or reducing computation resource usage at the expense of reducing the computation accuracy. Table 3 shows a list of exemplary term selections when values are converted from FP32 to bfloat16 or int8.

TABLE 3

Exemplary Term Selections for Conversion from FP32 to bfloat16 and int8

| Exemplary lower precision format | The number of lower precision values per floating-point value | Exemplary term selections for original values in FP32 |
| --- | --- | --- |
| bfloat16 | 2 | bx2_4p, bx2_3p |
| bfloat16 | 3 | bx3_9p, bx3_8p, bx3_6p |
| bfloat16 | 4 | bx4_16p, bx4_15p, bx4_13p, bx4_10p |
| bfloat16 | 5 | bx5_25p, bx5_22p, bx5_19p, bx5_15p |
| int8 | 2 | int8x2_4p, int8x2_3p |
| int8 | 3 | int8x3_9p, int8x3_8p, int8x3_6p |
| int8 | 4 | intx4_16p, intx4_15p, intx4_13p, intx4_10p |
| int8 | 5 | intx5_25p, intx5_22p, intx5_19p, intx5_15p |

An application using the embodiments of the invention may determine one or more quality of service (QoS) requirements as to the accuracy of arithmetic operations, workload limitation, computation speed requirement, and a processor implementing embodiments of the invention may determine how to meet the QoS requirements. For example, the processor may determine (1) what lower precision floating-point format to use (e.g., bfloat16 or other lower-precision format relative to the original float-point format), (2) how many lower precision float-point values to use to convert the original float-point format, and/or (3) how many terms to run arithmetic operations with. The determination may be based on the received instruction. The instruction may specify, other the two or more operands each containing an array of data elements, one or more operands that specify one or more of (1) to (3).

The determination by the processor may also be determined internally without the specification by the instruction in some embodiments. The processor may determine (1) to (3) based on the available computing resources (e.g., available circuitries, required bandwidth, and/or storage space in register/cache/memory for the required arithmetic operations). Note that the internal arithmetic operations including the conversion and reconstruction are invisible to an application using these embodiments of the invention.

Through the optional adjustment in some embodiments of the invention, an application can have more than the two options discussed earlier: using the original floating-points in the arithmetic operations (which may be accurate but slow) or converting each original floating-point values into multiple lower precision floating-point values, running integer arithmetic operations, and reconstructing back into floating-points in the original floating-point format (which may be fast and comparably accurate or even more accurate). Embodiments of the invention provide another knob to adjust the workload to suit the QoS requirements of an application and/or make better usage of available computing resources of a processor.

Note that the intermediate results in embodiments of the invention may be stored for out-of-order execution of instructions. For example, if values of a matrix A are split into two lower precision floating point values (e.g., A1 and A2 in FIG. 4) in a first instruction, the lower precision floating point values may be stored in a register in the PRF (or in a cache or memory). When a subsequent second instruction also uses matrix A, the stored lower precision floating point values of matrix A may be obtained from the register and no repeated quantization is necessary.

Accuracy of the Floating-Point Into Multiple Lower Precision Floating-Point Approaches Compared to Previous Approaches As discussed herein above, without embodiments of the invention, one may run arithmetic operations in the original floating-point format, which may be accurate but slow. One may also run the arithmetic operations in lower precision floating-point format, where each original floating-point value is approximated using a lower precision float-point value (in contrast to using multiple lower precision float-point values for the single original floating-point value in embodiments of the invention), which is less accurate but fast. Using embodiments of the invention, on the other hand, may provide both accuracy and speed or offer desired accuracy and speed compromise. Testing using pseudo-random values confirms the features of the embodiments of the invention.

Figure 6:
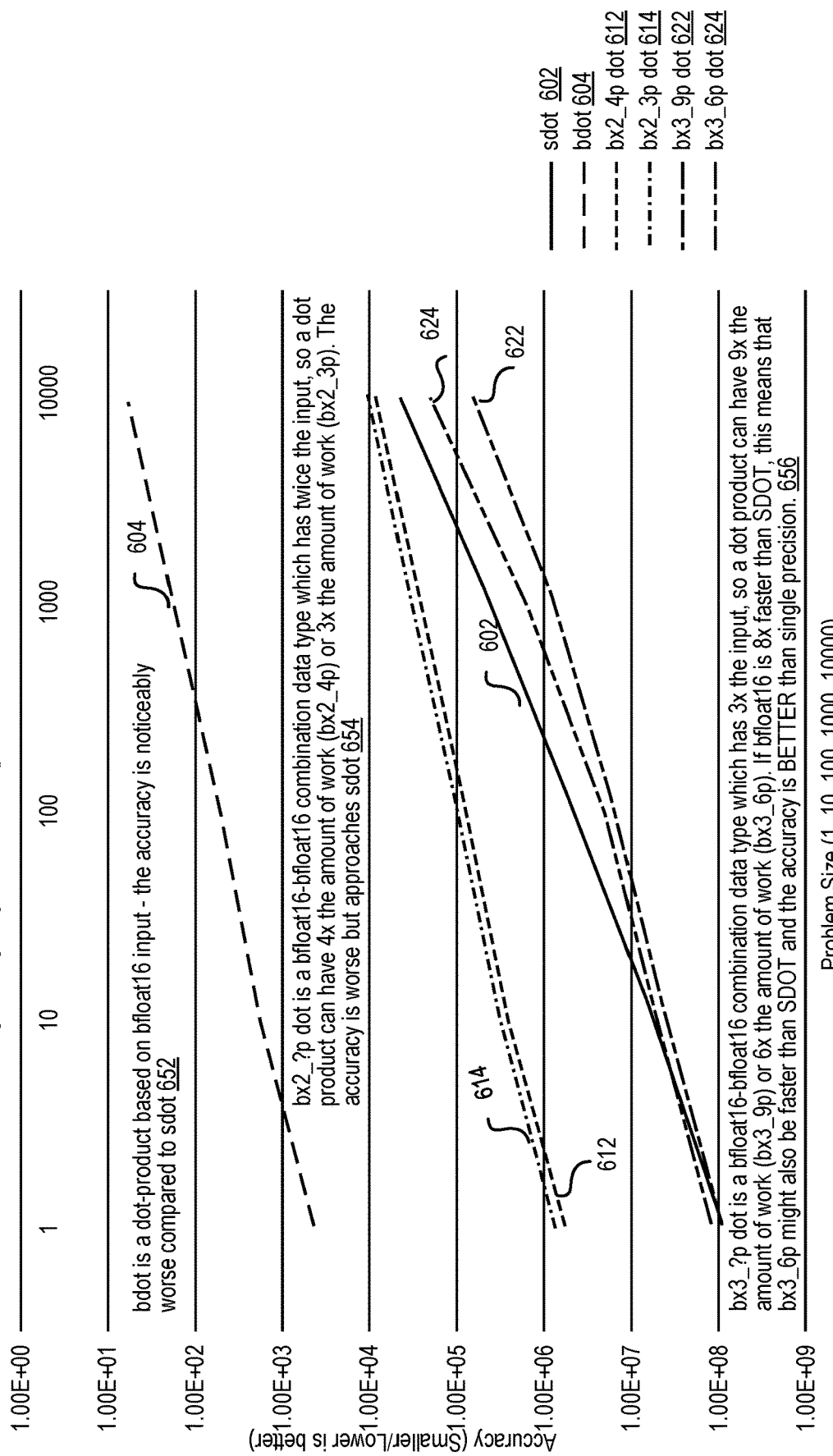
FIG. 6 shows data accuracy of an embodiment of the invention using floating-point into multiple lower precision floating-points approach comparing to previous approaches.

FIG. 6 shows data accuracy of an embodiment of the invention using floating-point into multiple lower precision floating-points approach comparing to previous approaches. The layout of FIG. 6 is similar to the one of FIG. 3 and the original data is pseudo-random values in FP64 in the range of [−1.0, 1.0] as explained at reference 650.

The baseline accuracy of the dot product of the original FP32 (as measured in the FP64 accuracy) is shown at reference 602. Similar to FIG. 3, the more consecutive dot products are performed, the less accurate is the result and the curve moves to lower accuracy as the problem size increases (upward from left to right in the figure). In comparison, each original FP32 value may be converted to a single bfloat16 value, and because the lower precision of the bfloat16, the accuracy curve at reference 604 is notably worse than that of FP32, as explained at reference 652.

One may split each FP32 value into two bfloat16 values and use all four terms of the dot products (similar to the four terms discussed above: A1*B1, A1*B2, A2*B1, and A2*B2). The accuracy curve at reference 612, noted as bx2_4p dot, is the result. The dot products may skip the lowest-order term (e.g., A2*B2), which results in the accuracy curve at reference 614 (noted as bx2_3p). Understandably, the accuracy of bx2_4p dot is better than the accuracy of bx2_3p, and both are not as accurate as the FP32 baseline. The worse accuracy of bx2 versus the baseline is also logical, since each bfloat16 has an 8-bit significand precision, two bfloat16 have 16-bit significand precision in total. In comparison, each FP32 has 24-bit significand precision, thus using two bfloat16 values to represent one FP32 values may cause a significant accuracy loss. The loss of accuracy in the initial conversion causes the overall accuracy of the conversion and reconstruction lower than the baseline.

One may also split each FP32 value into three bfloat16 and use all nine terms of the dot products (similar to the four terms discussed above: A1*B1, A1*B2, A1*B3, A2*B1, A2*B2, A2*B3, A3*B1, A3*B2, and A3*B3). The accuracy curve at reference 622, noted as bx3_9p dot, is the result. The dot products may skip the lowest-order terms whose coefficients add to 5 or more to get six terms (i.e., dropping A3*B2, B2*A3, and A3*B3), which results in the accuracy curve at reference 624 (noted as bx3_6p). Understandably, the accuracy of bx3_9p dot is better than the accuracy of bx3_6p.

It may seem counterintuitive, however, that the accuracy of both bx3_9p and bx3_6p is shown as better than the baseline accuracy of FP32. Upon closer examination, the accuracy improvement is also logical. Three bfloat16 have 24-bit significand precision in total, thus conversion from a FP32 value (which as 24-bit significand precision also) to three bloat16 values does not lose accuracy. During the consecutive dot products using the original FP32 values, the intermediate errors accumulate as discussed herein above relating to FIG. 3. In contrast, the conversion from a FP32 value to three bfloat16 values may be performed without losing accuracy, and the dot products using bfloat16 may maintain better accuracy during the intermediate arithmetic operations, since the accumulators for the intermediate arithmetic operation results have a bit width that is multiple times of that of the input values (e.g., 8 bits significand precision of input bfloat16 values vs. 24 bits significand precision of FP32 accumulator to store the intermediate arithmetic operation results). Thus, the accuracy of bx3_9p and bx3_6p is better than that of the original FP32. In that case, embodiments of the invention may achieve both better accuracy and fast execution speed (assuming the dedicated bfloat16 runs one or more order of magnitude faster than FP32).

Some Embodiments of the Invention

Figure 7A:
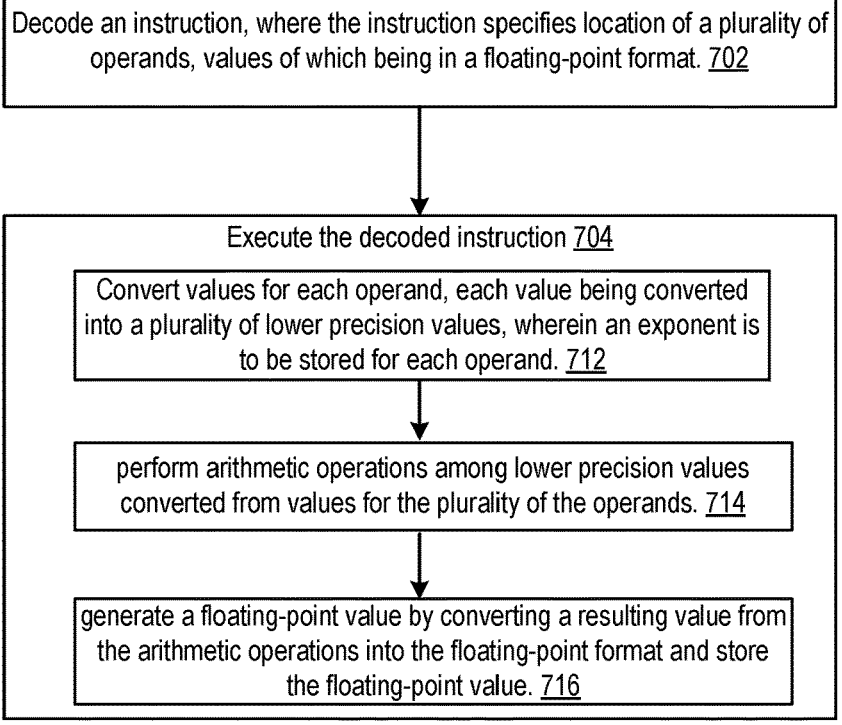
FIG. 7A is a flow diagram showing arithmetic operations including converting values in a floating-point into multiple lower precision values and reconstructing the resulting values back to the floating-point per one embodiment of the invention.

FIG. 7A is a flow diagram showing arithmetic operations including converting values in a floating-point into multiple lower precision values and reconstructing the resulting values from arithmetic operations back to the floating-point per one embodiment of the invention. Method 700 may be performed on a processor, which contains decoding circuitry and execution circuitry. At reference 702, the decoding circuitry decodes an instruction, where the instruction specifies locations of a plurality of operands, values of which being in a floating-point format. The instruction may specify at least two operands, each including one or more parameters for data elements to perform arithmetic operations. The operation code (opcode) of the instruction may indicate the arithmetic operations to be performed. Additionally, the opcode and/or the operand may indicate the values of the plurality of operands being in the floating-point format.

For example, each of the operand may indicate a vector (1D array), a matrix (2D array) that is in a floating-point format. Each operand may also indicate a multi-dimensional tensor (geometric objects that describe linear relations between geometric vectors, scalars, and other tensors) or scalar in a floating-point format as well. The floating-point format may be one of standard FP16, FP32, FP64, FP128, or FP256, or a proprietary floating-point format that has its own definition of exponent width, significand precision, and/or sign bit. Each vector or matrix may contain multiple data elements, and each being stored in one or more storage units such as registers, caches, or computer memory. The operand may point to the locations of the storage units (e.g., memory, cache, or register) so that the decoding circuitry may obtain the data elements of the vector or matrix. The arithmetic operations may be one or more of addition, subtraction, multiplication, and division on the data elements.

In one embodiment, one or more additional operands may specify one or more quality of service (QoS) requirements for the arithmetic operations. The QoS requirement may be one or more of the accuracy of arithmetic operations (the accuracy level expected to maintain after the arithmetic operations required by the instruction), workload limitation (the computing resources expected to consume during the arithmetic operations), computation speed requirement (the execution time expected to complete the arithmetic operations). The QoS requirement determines how the execution circuitry executes the decoded instruction in one embodiment. Additionally or alternatively, the opcode may specify one or more quality of service (QoS) requirements for the arithmetic operations in one embodiment. Furthermore, the opcode and one or more additional operands may specify the accumulated bit length to store the arithmetic operation results (e.g., the bit length that is the multiple times of the input values as discussed herein above).

At reference 704, the execution circuitry executes the decoded instruction. The execution includes converting values for each operand, each value being converted into a plurality of lower precision values at reference 712, where an exponent is to be stored for each operand. The exponent for the each operand may be stored in a register, a cache, or in the memory. In one embodiment, the lower precision values are in an integer format such as int4, int8, int16, int32, int64, int128, or another n-bit integer. The integer format has lesser bit than the significand precision bits of the floating-point format used by the vector or matrix. In another embodiment, the lower precision values are in another floating-point format that has lesser bit than the significand precision bits of the floating-point format used by the vector or matrix. When the lower precision values are in the other lower precision floating-point format, the stored exponent is the one for the lower precision values for the operand.

The number of the converted lower precision values per value may depend on the additional operand for the QoS requirement in on embodiment. For example, when the accuracy of the arithmetic operations is expected to be high, each value may be converted to more lower precision values (e.g., each A may be converted into A1, A2, and A3, instead of A1 and A2 in the examples of FIGS. 1 and 4). Additionally, when more computing resources are available for the execution, each value may also be converted to more lower precision values. Furthermore, when the execution time is expected to be short (e.g., lower than a specified threshold or generic indication of a fast execution), each value may be convert to less lower precision values.

The execution further includes performing arithmetic operations among lower precision values converted from values for the plurality of the operands at reference 714. The arithmetic operations include the ones shown in FIGS. 1 and 4 and discussed in the related paragraphs herein above. The arithmetic operations may be performed in circuits dedicated to specific arithmetic operations. For example, when the execution circuitry comprises one or more dedicated multiplier-accumulator (MAC) circuits, and the one or more dedicated MAC circuits are to perform integer multiply-accumulate operations. In one embodiment, each MAC circuit is a fused multiply add (FMA) circuit. The circuits may be dedicated to low precision floating-point values in bfloat16 format in one embodiment. For example, dedicated circuits have been built for bfloat16 arithmetic operations in machine learning (ML) and artificial intelligence (AI) applications.

The number of the arithmetic operations may depend on the additional operand for the QoS requirement in on embodiment. For example, when the accuracy of the arithmetic operations is expected to be high, more arithmetic operations are performed; and when the accuracy of the arithmetic operations is expected to be lower, some operations are skipped (e.g., instead of performing the four terms of inner products to get a high accuracy in FIG. 1, the lowest order may be skipped thus resulting in a lower accuracy). Additionally, when the computing resources be consumed is expected to be high, more arithmetic operations are performed. Furthermore, when the execution time is expected to be short (lower than a specified threshold or generic indication of a fast execution), some operations are skipped (e.g., performing bx3_8p instead of bx3_9p to skip the arithmetic operations for the lowest order term as shown in FIG. 6).

The execution additionally includes generating a floating-point value by converting a resulting value from the arithmetic operations into the floating-point format and storing the floating-point value at reference 716. The generation of the floating-point value includes the reconstructions shown in FIGS. 1 and 4 and discussed in the related paragraphs herein above. The floating-point value may be stored in a location specified by the instruction (e.g., memory, cache, or register). In one embodiment, the floating-point value is stored in a location that has stored the input operands.

Figure 7B:
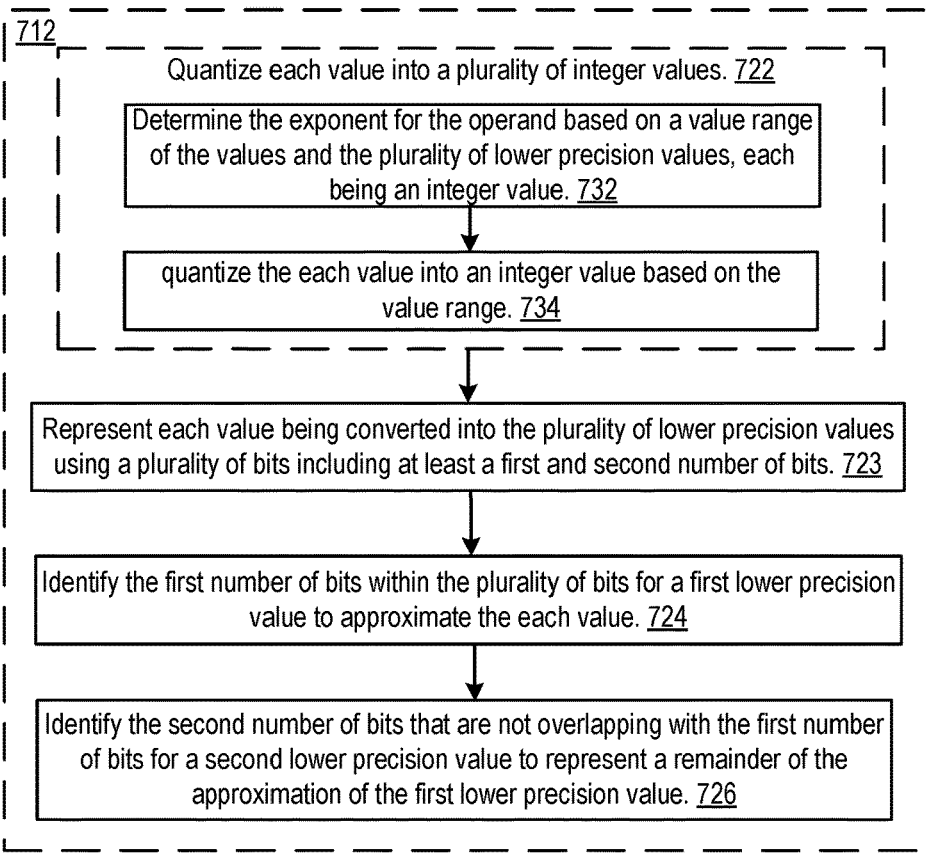
FIG. 7B is a flow diagram showing the value conversion from values in a floating-point into multiple lower precision values per one embodiment of the invention.

FIG. 7B is a flow diagram showing the value conversion from values in a floating-point into multiple lower precision values per one embodiment of the invention. The operations may be an embodiment of operations in reference 712 of FIG. 7A.

When the value conversion is to convert each value to integers, each value in the floating-point format is quantized at reference 722. The quantization includes determining the exponent for the operand based on a value range of the values and the plurality of integer values at reference 732.

In one embodiment, the quantization includes determining the exponent for the operand based on the value range of the values and the plurality of lower precision values at reference 732, each being an integer value. Then at reference 734, the each value is quantized into an integer value based on the value range (e.g., the value num in Examples 1-4). The quantization is discussed in more details relating to Examples 1-4 herein above.

In one embodiment, the instruction may have one or more operand indicating the range of values for each operand indicating the values that are in the floating-point format. Thus, the quantization may use the range of values from the instruction in the embodiment. In another embodiment, the range of the values are not provided by the instruction, and the range is determined based on examining all the values for the operands. For example, the processor may scan all the data element identified by an operand and determine the range for the operand.

At reference 723, each value (the original values or ones resulting from the quantization of the original values) is represented using a plurality of bits including at least a first and second number of bits. At reference 724, the first number of bits within the plurality of bits for a first lower precision value is identified to approximate the each value; and at reference 724, the second number of bits that are not overlapping with the first number of bits for a second lower precision value is identified to represent a remainder of the approximation of the first lower precision value, where the first and second lower precision values are used to perform the arithmetic operations with lower precision values from one or more other operands. FIGS. 1-2 provide examples of the identification of first and second number of bits for the conversion to integers approach, and FIG. 4-5 provide similar examples for the conversion to lower-precision floating-point approach.

Using embodiments of the invention, General Matrix-Matrix Multiplication (GEMM) and other vector/matrix arithmetic operations may be run more efficiently, and with adjustable accuracy options. The conversion and reconstruction approaches in embodiments of the invention may be applied to machine learning (ML) and artificial intelligence (AI), high-performance computing (HPC) applications, and other applications. For example, the original values in vectors and matrices may be converted to the lower precision values, and the lower precision values are used to perform arithmetic operations. The arithmetic operations may be run one or more order of magnitude faster than the original values when dedicated hardware circuits are implemented for these arithmetic operations. The lower precision values may use the hardware circuits to generate weight to a neural network; and they may also use the same or different hardware circuits to generate input values to an activation function. Once the arithmetic operations leverages the hardware circuits, the resulting values may then be converted back into the original floating-point format.

Additionally, using hardware circuits to perform arithmetic operations in higher precision floating-point formats (e.g., FP128, FP256, etc.) may be expensive and impractical in some computer architectures. Embodiments of the invention may convert values in a higher precision floating-point format, each to a large number of values in a lower precision format (e.g., int4, int8, bfloat16), and perform the arithmetic operations in the lower precision format. The results in the lower precision format may then be reconstructed into the higher precision floating-point format as discussed in FIGS. 1-7. Thus, embodiments of the invention may alleviate the need to build hardware circuits to perform arithmetic operations in higher precision floating-point formats.

Exemplary Processor Architectures and Data Types

FIG. 8A is a block diagram showing both an exemplary in-order pipeline and an exemplary register renaming, out-of-order issue/execution pipeline according to embodiments of the invention. FIG. 8B is a block diagram showing both an exemplary embodiment of an in-order architecture core and an exemplary register renaming, out-of-order issue/execution architecture core to be included in a processor according to embodiments of the invention. The solid lined boxes in FIGS. 8A-B show the in-order pipeline and in-order core, while the optional addition of the dashed lined boxes shows the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a schedule (also known as a dispatch or issue) stage 812, a register read/memory read stage 814, an execute stage 816, a write back/memory write stage 818, an exception handling stage 822, and a commit stage 824. Each stage may include circuitry to perform the operations in the stage, and the circuitry may be referred to as fetch circuitry, decoding circuitry, scheduling circuitry, execution circuitry, and etc. to denote that hardware circuits are used to implement these stages.

FIG. 8B shows processor core 890 including a front-end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front-end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front-end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general-purpose registers. The physical register file(s) unit(s) 858 is overlapped by the retirement unit 854 to show various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2, Advanced Matrix Extensions (AMX) and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9:
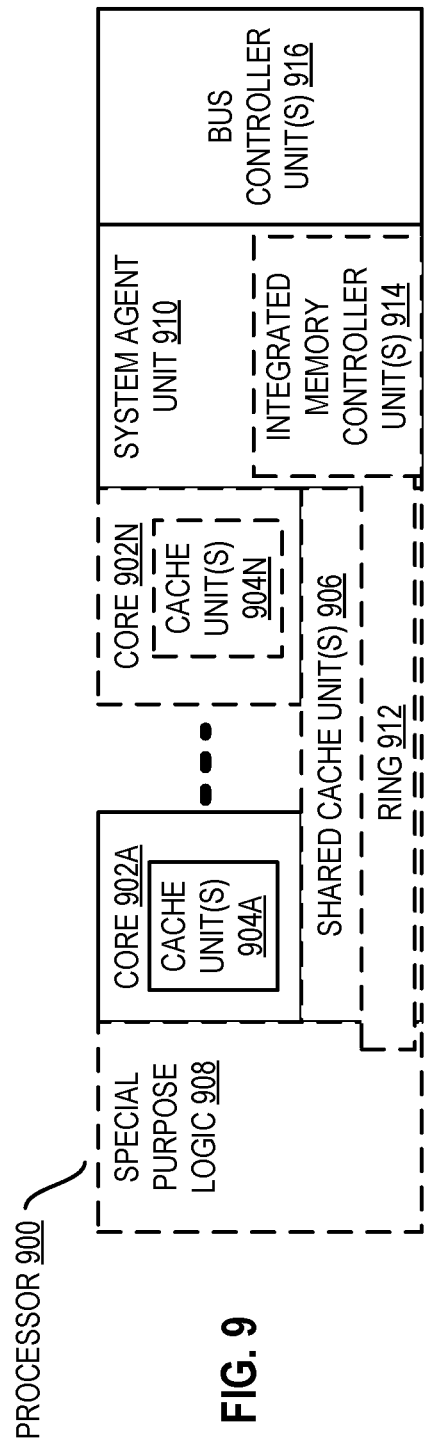
FIG. 9 is a block diagram of a single core processor and a multicore processor with integrated memory controller and graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 show a processor 900 with a single core 902A, a system agent 910, a set of one or more bus controller units 916, while the optional addition of the dashed lined boxes shows an alternative processor 900 with multiple cores 902A-N, a set of one or more integrated memory controller unit(s) 914 in the system agent unit 910, and special purpose logic 908 (e.g., integrated graphics logic).

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring-based interconnect unit 912 interconnects the special purpose logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the special purpose logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
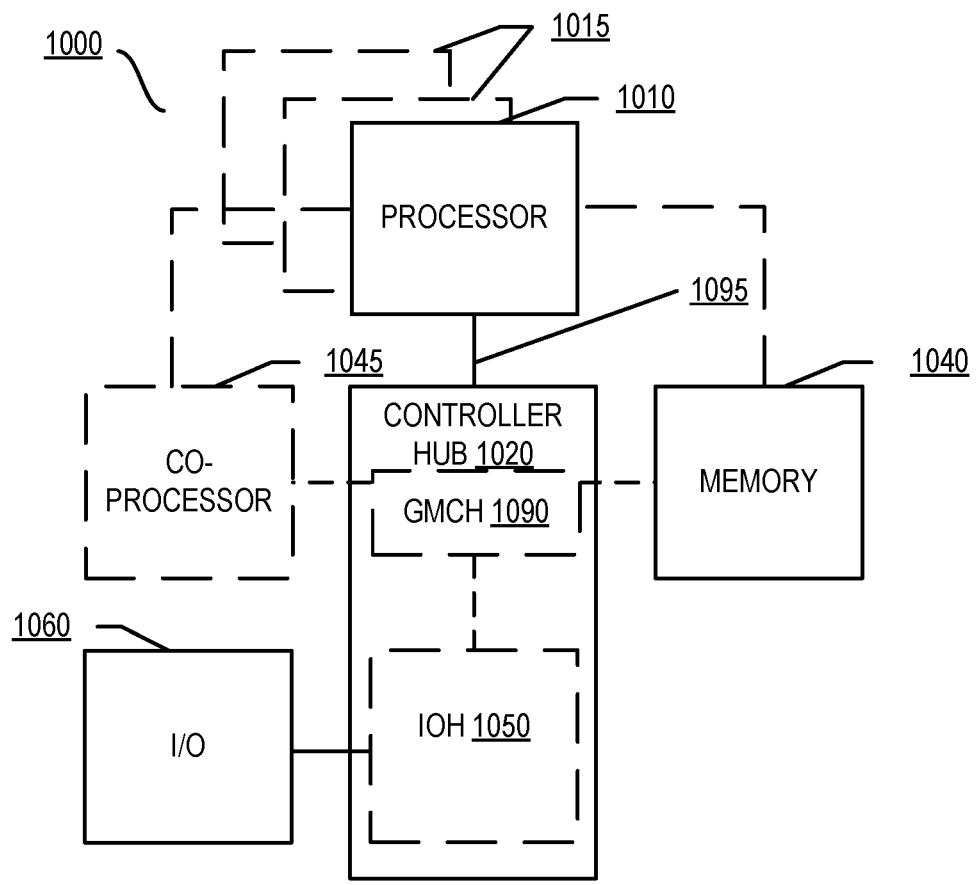
FIG. 10 shows a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random-access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the processors 1010 and 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
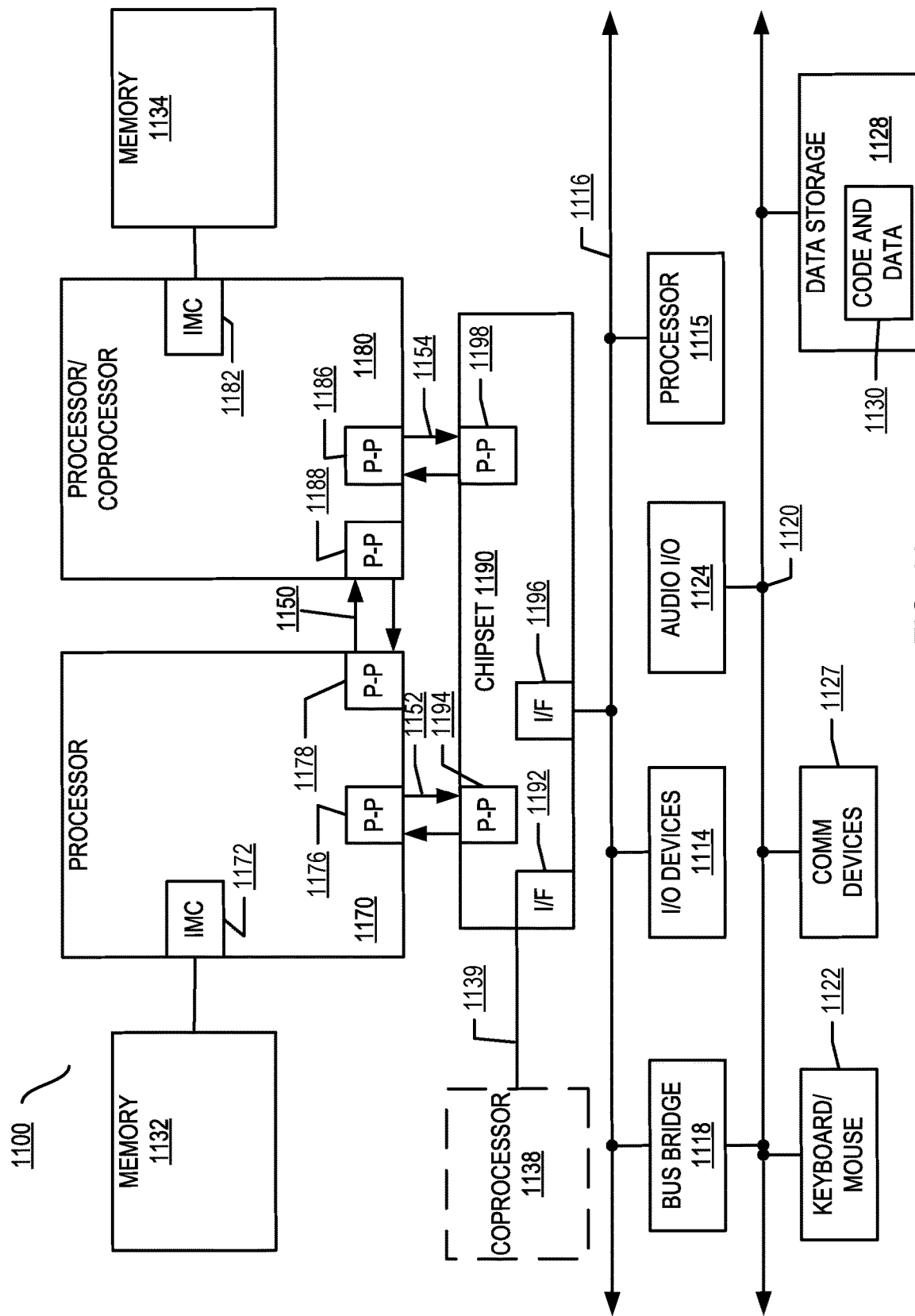
FIG. 11 shows a block diagram of a second system in accordance with an embodiment of the present invention.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory '434, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
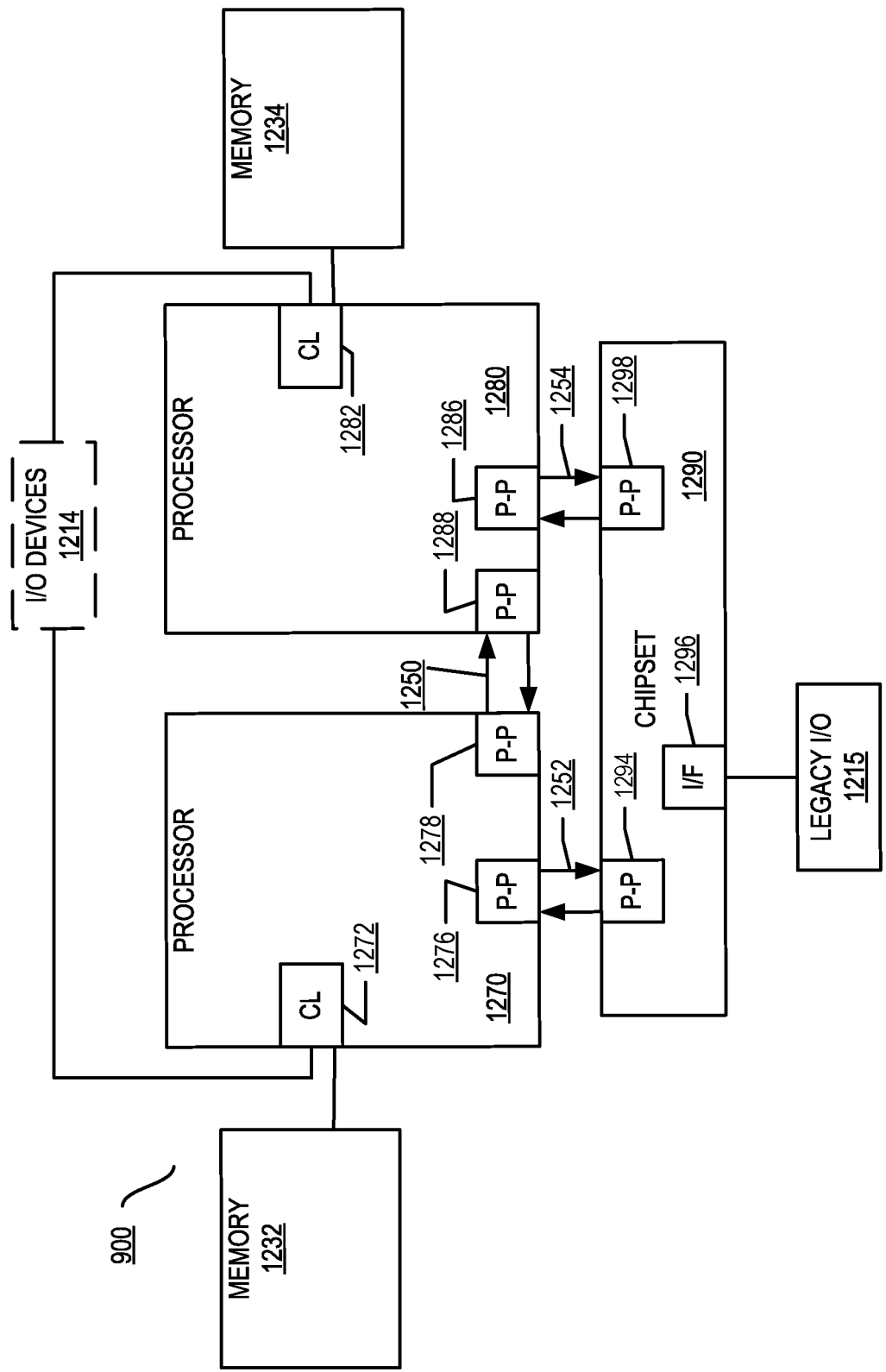
FIG. 12 shows a block diagram of a third system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 shows that the processors 1270, 1280 may include integrated memory and I/O control logic ("CL") 1272 and 1282, respectively. Thus, the CL 1272, 1282 include integrated memory controller units and include I/O control logic. FIG. 12 shows that not only are the memories 1232, 1234 coupled to the CL 1272, 1282, but also that I/O devices 1214 are also coupled to the control logic 1272, 1282. Legacy I/O devices 1215 are coupled to the chipset 1290.

Figure 13:
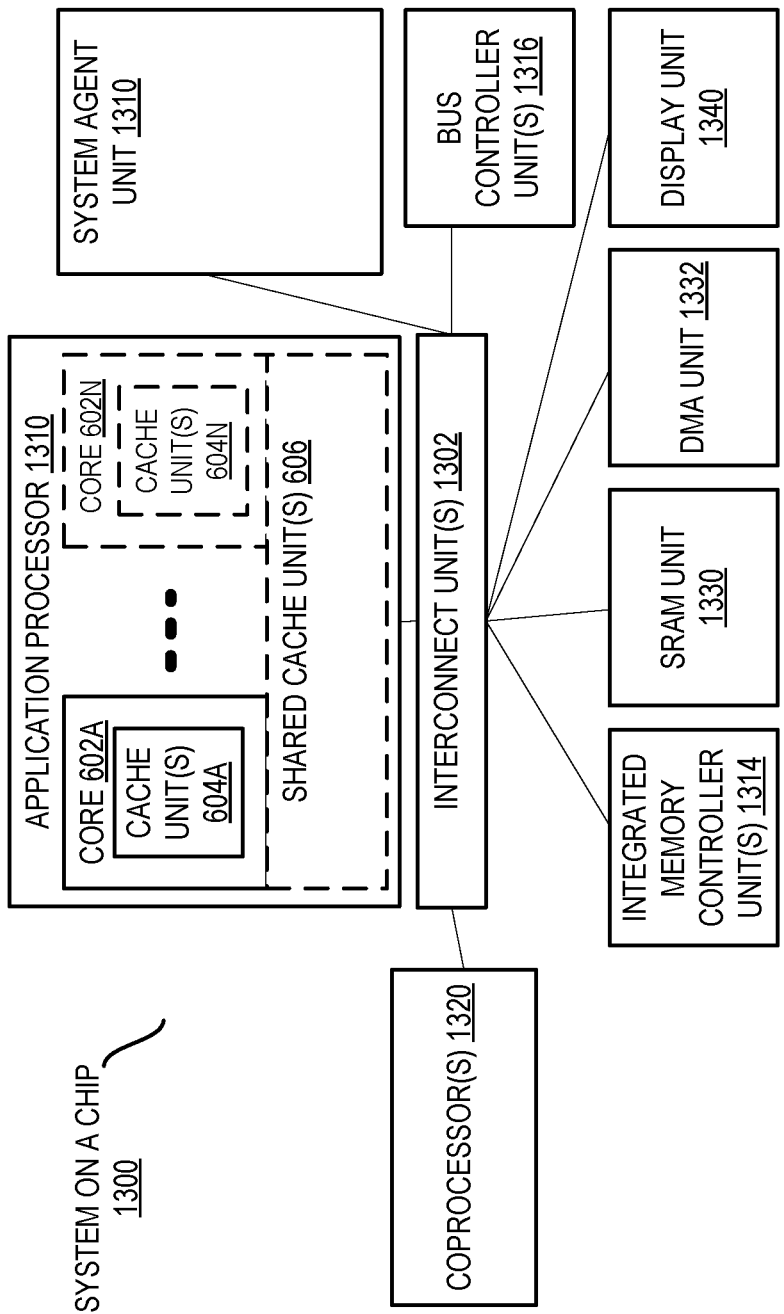
FIG. 13 shows a block diagram of a system on a chip (SoC) in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 shown in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), digital video/versatile disc (DVD), Blu-ray (BD), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
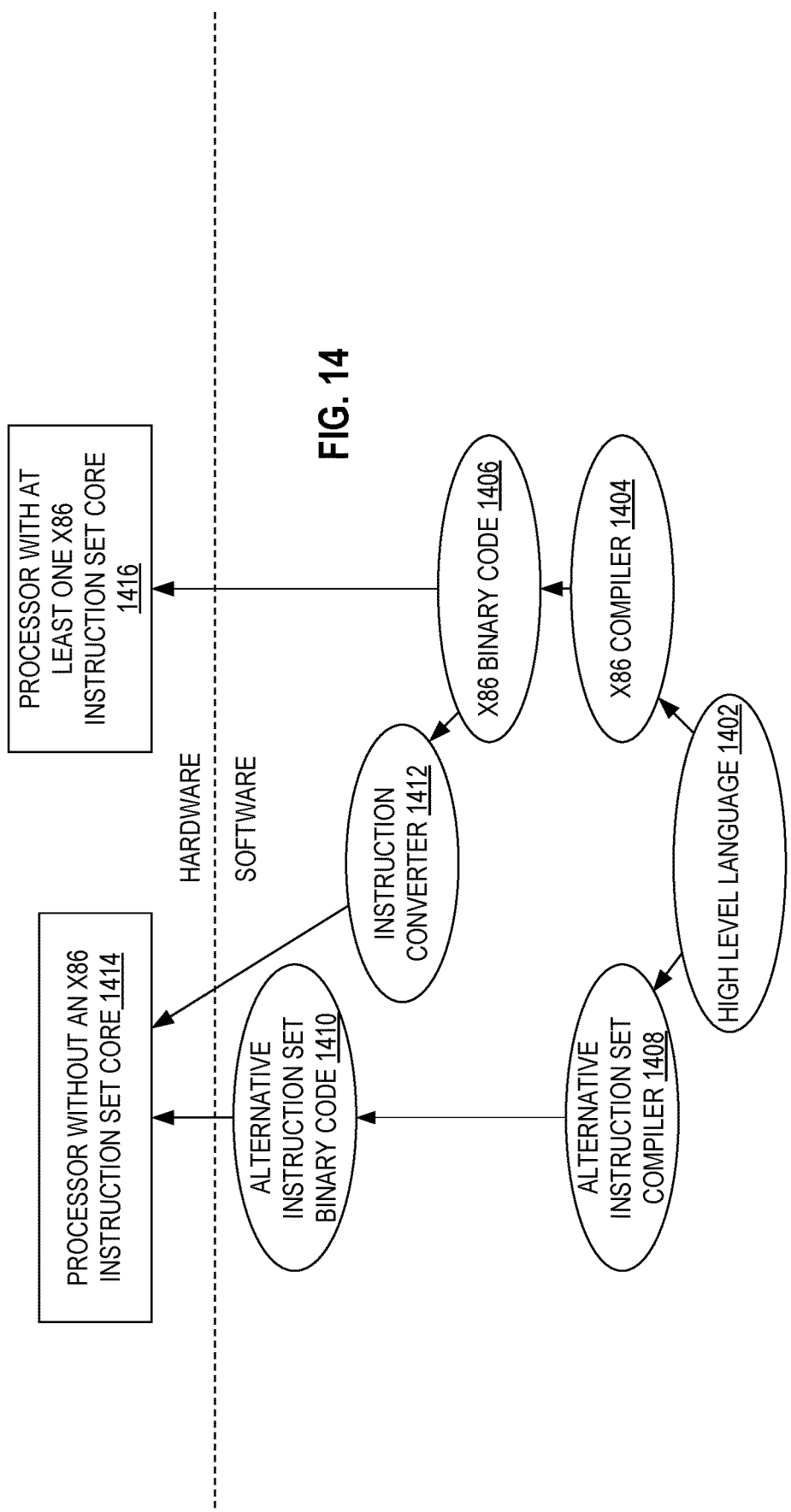
FIG. 14 shows a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high-level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high-level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 15B:
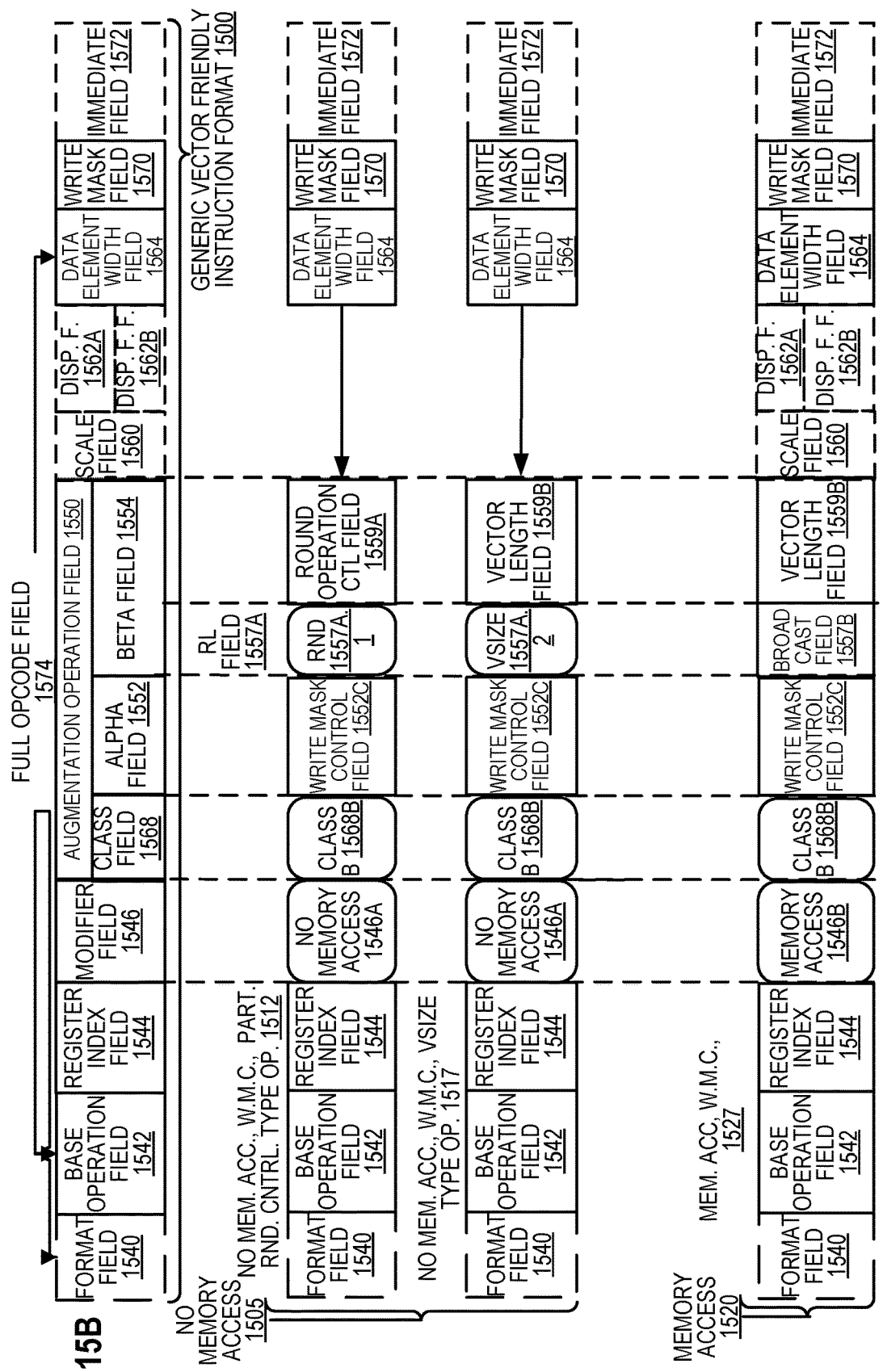

FIGS. 15A-15B are block diagrams showing a generic vector friendly instruction format and instruction templates thereof according to embodiments of the invention. FIG. 15A is a block diagram showing a generic vector friendly instruction format and class A instruction templates thereof according to embodiments of the invention; while FIG. 15B is a block diagram showing the generic vector friendly instruction format and class B instruction templates thereof according to embodiments of the invention. Specifically, a generic vector friendly instruction format 1500 for which are defined class A and class B instruction templates, both of which include no memory access 1505 instruction templates and memory access 1520 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 15A include: 1) within the no memory access 1505 instruction templates there is shown a no memory access, full round control type operation 1510 instruction template and a no memory access, data transform type operation 1515 instruction template; and 2) within the memory access 1520 instruction templates there is shown a memory access, temporal 1525 instruction template and a memory access, non-temporal 1530 instruction template. The class B instruction templates in FIG. 15B include: 1) within the no memory access 1505 instruction templates there is shown a no memory access, write mask control, partial round control type operation 1512 instruction template and a no memory access, write mask control, vsize type operation 1517 instruction template; and 2) within the memory access 1520 instruction templates there is shown a memory access, write mask control 1527 instruction template.

The generic vector friendly instruction format 1500 includes the following fields listed below in the order shown in FIGS. 15A-15B.

Format field 1540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1542—its content distinguishes different base operations.

Register index field 1544—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1546—its content distinguishes occurrences of instructions in the generic vector instruction format that specify memory access from those that do not; that is, between no memory access 1505 instruction templates and memory access 1520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1550—its content distinguishes which one of a variety of different operations to be performed in addition to the base operation. This field is context specific. In one embodiment of the invention, this field is divided into a class field 1568, an alpha field 1552, and a beta field 1554. The augmentation operation field 1550 allows common groups of operations to be performed in a single instruction rather than 2, 3, or 4 instructions.

Scale field 1560—its content allows for the scaling of the index field's content for memory address generation (e.g., for address generation that uses $2^{scale}*\text{index}+\text{base}$).

Displacement Field 1562A—its content is used as part of memory address generation (e.g., for address generation that uses $2^{scale}* \text{index}+\text{base}+\text{displacement}$).

Displacement Factor Field 1562B (note that the juxtaposition of displacement field 1562A directly over displacement factor field 1562B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1574 (described herein) and the data manipulation field 1554C. The displacement field 1562A and the displacement factor field 1562B are optional in the sense that they are not used for the no memory access 1505 instruction templates and/or different embodiments may implement only one or none of the two.

Data element width field 1564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1570 allows for partial vector operations, including loads, stores, arithmetic, logical, etc. While embodiments of the invention are described in which the write mask field's 1570 content selects one of a number of write mask registers that contains the write mask to be used (and thus the write mask field's 1570 content indirectly identifies that masking to be performed), alternative embodiments instead or additional allow the mask write field's 1570 content to directly specify the masking to be performed.

Immediate field 1572—its content allows for the specification of an immediate. This field is optional in the sense that is it not present in an implementation of the generic vector friendly format that does not support immediate and it is not present in instructions that do not use an immediate.

Class field 1568—its content distinguishes between different classes of instructions. With reference to FIGS. 15A-B, the contents of this field select between class A and class B instructions. In FIGS. 15A-B, rounded corner squares are used to indicate a specific value is present in a field (e.g., class A 1568A and class B 1568B for the class field 1568 respectively in FIGS. 15A-B).

Instruction Templates of Class A

In the case of the non-memory access 1505 instruction templates of class A, the alpha field 1552 is interpreted as an RS field 1552A, whose content distinguishes which one of the different augmentation operation types are to be performed (e.g., round 1552A.1 and data transform 1552A.2 are respectively specified for the no memory access, round type operation 1510 and the no memory access, data transform type operation 1515 instruction templates), while the beta field 1554 distinguishes which of the operations of the specified type is to be performed. In the no memory access 1505 instruction templates, the scale field 1560, the displacement field 1562A, and the displacement scale filed 1562B are not present.

No-Memory Access Instruction Templates—Full Round Control Type Operation

In the no memory access full round control type operation 1510 instruction template, the beta field 1554 is interpreted as a round control field 1554A, whose content(s) provide static rounding. While in the described embodiments of the invention the round control field 1554A includes a suppress all floating-point exceptions (SAE) field 1556 and a round operation control field 1558, alternative embodiments may support may encode both these concepts into the same field or only have one or the other of these concepts/fields (e.g., may have only the round operation control field 1558).

SAE field 1556—its content distinguishes whether or not to disable the exception event reporting; when the SAE field's 1556 content indicates suppression is enabled, a given instruction does not report any kind of floating-point exception flag and does not raise any floating-point exception handler.

Round operation control field 1558—its content distinguishes which one of a group of rounding operations to perform (e.g., Round-up, Round-down, Round-towards-zero and Round-to-nearest). Thus, the round operation control field 1558 allows for the changing of the rounding mode on a per instruction basis. In one embodiment of the invention where a processor includes a control register for specifying rounding modes, the round operation control field's 1558 content overrides that register value.

No Memory Access Instruction Templates—Data Transform Type Operation

In the no memory access data transform type operation 1515 instruction template, the beta field 1554 is interpreted as a data transform field 1554B, whose content distinguishes which one of a number of data transforms is to be performed (e.g., no data transform, swizzle, broadcast).

In the case of a memory access 1520 instruction template of class A, the alpha field 1552 is interpreted as an eviction hint field 1552B, whose content distinguishes which one of the eviction hints is to be used (in FIG. 15A, temporal 1552B.1 and non-temporal 1552B.2 are respectively specified for the memory access, temporal 1525 instruction template and the memory access, non-temporal 1530 instruction template), while the beta field 1554 is interpreted as a data manipulation field 1554C, whose content distinguishes which one of a number of data manipulation operations (also known as primitives) is to be performed (e.g., no manipulation; broadcast; up conversion of a source; and down conversion of a destination). The memory access 1520 instruction templates include the scale field 1560, and optionally the displacement field 1562A or the displacement factor field 1562B (sometimes referred to as displacement scale field).

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1552 is interpreted as a write mask control (Z) field 1552C, whose content distinguishes whether the write masking controlled by the write mask field 1570 should be a merging or a zeroing.

In the case of the non-memory access 1505 instruction templates of class B, part of the beta field 1554 is interpreted as an RL field 1557A, whose content distinguishes which one of the different augmentation operation types are to be performed (e.g., round 1557A.1 and vector length (VSIZE) 1557A.2 are respectively specified for the no memory access, write mask control, partial round control type operation 1512 instruction template and the no memory access, write mask control, VSIZE type operation 1517 instruction template), while the rest of the beta field 1554 distinguishes which of the operations of the specified type is to be performed. In the no memory access 1505 instruction templates, the scale field 1560, the displacement field 1562A, and the displacement scale filed 1562B are not present.

In the no memory access, write mask control, partial round control type operation 1510 instruction template, the rest of the beta field 1554 is interpreted as a round operation field 1559A and exception event reporting is disabled (a given instruction does not report any kind of floating-point exception flag and does not raise any floating-point exception handler).

Round operation control field 1559A—just as round operation control field 1558, its content distinguishes which one of a group of rounding operations to perform (e.g., Round-up, Round-down, Round-towards-zero and Round-to-nearest). Thus, the round operation control field 1559A allows for the changing of the rounding mode on a per instruction basis. In one embodiment of the invention where a processor includes a control register for specifying rounding modes, the round operation control field's 1559 content overrides that register value.

In the no memory access, write mask control, VSIZE type operation 1517 instruction template, the rest of the beta field 1554 is interpreted as a vector length field 1559B, whose content distinguishes which one of a number of data vector lengths is to be performed on (e.g., 128, 256, or 512 byte).

In the case of a memory access 1520 instruction template of class B, part of the beta field 1554 is interpreted as a broadcast field 1557B, whose content distinguishes whether or not the broadcast type data manipulation operation is to be performed, while the rest of the beta field 1554 is interpreted the vector length field 1559B. The memory access 1520 instruction templates include the scale field 1560, and optionally the displacement field 1562A or the displacement factor field 1562B.

With regard to the generic vector friendly instruction format 1500, a full opcode field 1574 is shown including the format field 1540, the base operation field 1542, and the data element width field 1564. While one embodiment is shown where the full opcode field 1574 includes all of these fields, the full opcode field 1574 includes less than all of these fields in embodiments that do not support all of them. The full opcode field 1574 provides the operation code (opcode).

The augmentation operation field 1550, the data element width field 1564, and the write mask field 1570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

FIG. 16A-D are block diagrams showing an exemplary specific vector friendly instruction format according to embodiments of the invention. FIG. 16 shows a specific vector friendly instruction format 1600 that is specific in the sense that it specifies the location, size, interpretation, and order of the fields, as well as values for some of those fields. The specific vector friendly instruction format 1600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 15 into which the fields from FIG. 16 map are shown.

It should be understood that, although embodiments of the invention are described with reference to the specific vector friendly instruction format 1600 in the context of the generic vector friendly instruction format 1500 for illustrative purposes, the invention is not limited to the specific vector friendly instruction format 1600 except where claimed. For example, the generic vector friendly instruction format 1500 contemplates a variety of possible sizes for the various fields, while the specific vector friendly instruction format 1600 is shown as having fields of specific sizes. By way of specific example, while the data element width field 1564 is shown as a one-bit field in the specific vector friendly instruction format 1600, the invention is not so limited (that is, the generic vector friendly instruction format 1500 contemplates other sizes of the data element width field 1564).

The generic vector friendly instruction format 1500 includes the following fields listed below in the order shown in FIG. 16A.

EVEX Prefix (Bytes 0-3) 1602—is encoded in a four-byte form.

Format Field 1540 (EVEX Byte 0, bits [7:0])—the first byte (EVEX Byte 0) is the format field 1540 and it contains 0x62 (the unique value used for distinguishing the vector friendly instruction format in one embodiment of the invention).

The second-fourth bytes (EVEX Bytes 1-3) include a number of bit fields providing specific capability.

REX field 1605 (EVEX Byte 1, bits [7-5])—consists of a EVEX.R bit field (EVEX Byte 1, bit [7]-R), EVEX.X bit field (EVEX byte 1, bit [6]-X), and 1157BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1610—this is the first part of the REX' field 6510 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1615 (EVEX byte 1, bits [3:0]-mmmm)—its content encodes an implied leading opcode byte (0F, 0F 38, or 0F 3).

Data element width field 1564 (EVEX byte 2, bit [7]-W)—is represented by the notation EVEX.W. EVEX.W is used to define the granularity (size) of the datatype (either 32-bit data elements or 64-bit data elements).

EVEX.vvvv 1620 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1620 encodes the 4 low-order bits of the first source register specifier stored in inverted (1s complement) form. Depending on the instruction, an extra different EVEX bit field is used to extend the specifier size to 32 registers.

EVEX.U 1568 Class field (EVEX byte 2, bit [2]-U)—If EVEX.U=0, it indicates class A or EVEX.U0; if EVEX.U=1, it indicates class B or EVEX.U1.

Prefix encoding field 1625 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2-bit SIMD prefix encodings, and thus not require the expansion.

Alpha field 1552 (EVEX byte 3, bit [7]-EH; also known as EVEX.EH, EVEX.rs, EVEX.RL, EVEX.write mask control, and EVEX.N; also shown with α)—as previously described, this field is context specific.

Beta field 1554 (EVEX byte 3, bits [6:4]-SSS, also known as EVEX.$s_{2-0}$, EVEX.r2-0, EVEX.rr1, EVEX.LL0, EVEX.LLB; also shown with βββ)—as previously described, this field is context specific.

REX' field 1610 —this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1570 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1630 (Byte 4) is also known as the opcode byte. Part of the opcode is specified in this field.

MOD R/M Field 1640 (Byte 5) includes MOD field 1642, Reg field 1644, and R/M field 1646. As previously described, the MOD field's 1642 content distinguishes between memory access and non-memory access operations. The role of Reg field 1644 can be summarized to two situations: encoding either the destination register operand or a source register operand, or be treated as an opcode extension and not used to encode any instruction operand. The role of R/M field 1646 may include the following: encoding the instruction operand that references a memory address, or encoding either the destination register operand or a source register operand.

Scale, Index, Base (SIB) Byte (Byte 6)—As previously described, the scale field's 1550 content is used for memory address generation. SIB.xxx 1654 and SIB.bbb 1656—the contents of these fields have been previously referred to with regard to the register indexes Xxxx and Bbbb.

Displacement field 1562A (Bytes 7-10)—when MOD field 1642 contains 10, bytes 7-10 are the displacement field 1562A, and it works the same as the legacy 32-bit displacement (disp32) and works at byte granularity.

Displacement factor field 1562B (Byte 7)—when MOD field 1642 contains 01, byte 7 is the displacement factor field 1562B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1562B is a reinterpretation of disp8; when using displacement factor field 1562B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1562B substitutes the legacy x86 instruction set 8-bit displacement. Thus, the displacement factor field 1562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1572 operates as previously described.

Full Opcode Field

FIG. 16B is a block diagram showing the fields of the specific vector friendly instruction format 1600 that make up the full opcode field 1574 according to one embodiment of the invention. Specifically, the full opcode field 1574 includes the format field 1540, the base operation field 1542, and the data element width (W) field 1564. The base operation field 1542 includes the prefix encoding field 1625, the opcode map field 1615, and the real opcode field 1630.

Register Index Field

FIG. 16C is a block diagram showing the fields of the specific vector friendly instruction format 1600 that make up the register index field 1544 according to one embodiment of the invention. Specifically, the register index field 1544 includes the REX field 1605, the REX' field 1610, the MODR/M.reg field 1644, the MODR/M.r/m field 1646, the VVVV field 1620, xxx field 1654, and the bbb field 1656.

Augmentation Operation Field

Figure 16D:
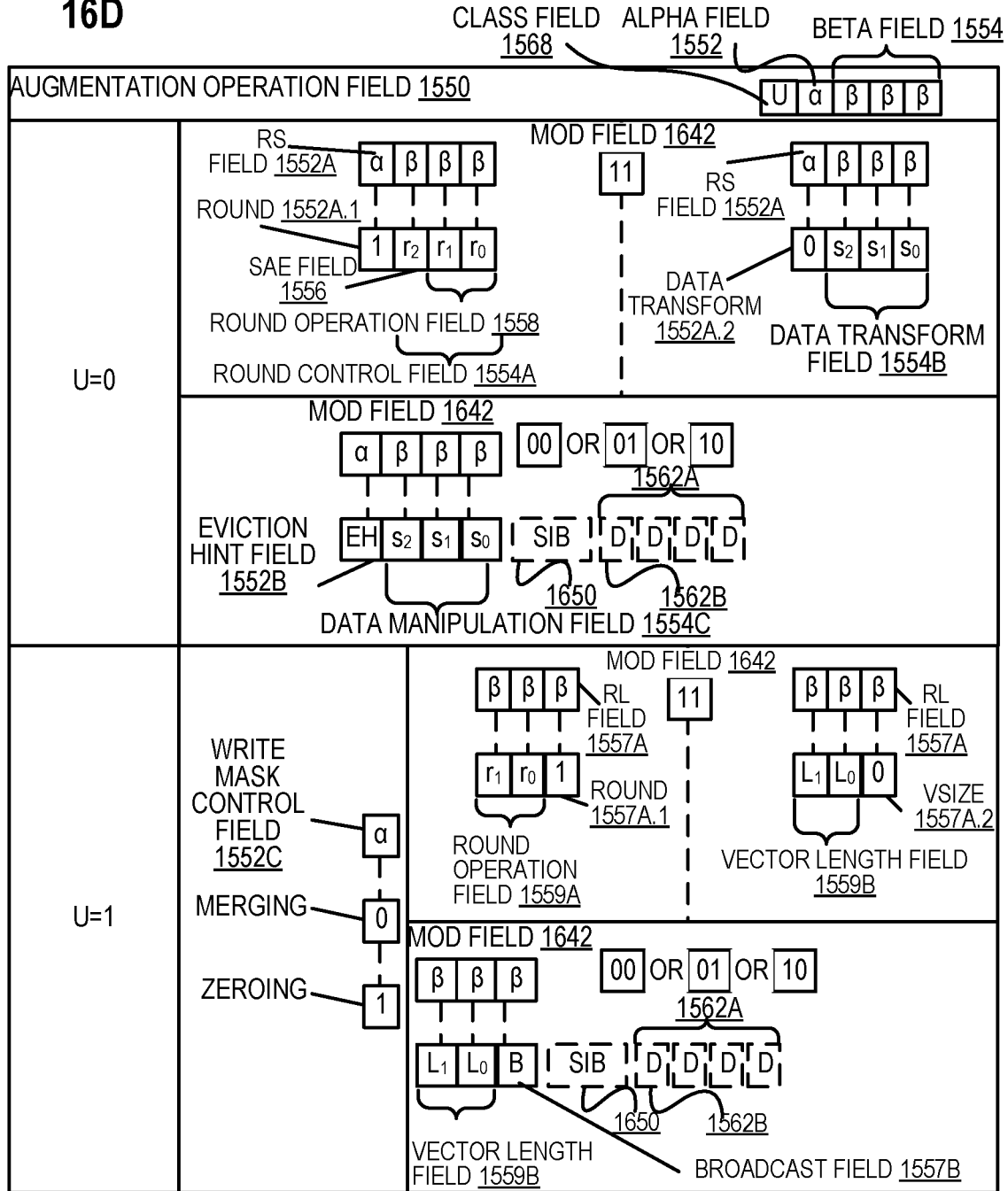

FIG. 16D is a block diagram showing the fields of the specific vector friendly instruction format 1600 that make up the augmentation operation field 1550 according to one embodiment of the invention. When the class (U) field 1568 contains 0, it signifies EVEX.U0 (class A 1568A); when it contains 1, it signifies EVEX.U1 (class B 1568B). When U=0 and the MOD field 1642 contains 11 (signifying a no memory access operation), the alpha field 1552 (EVEX byte 3, bit [7]-EH) is interpreted as the rs field 1552A. When the rs field 1552A contains a 1 (round 1552A.1), the beta field 1554 (EVEX byte 3, bits [6:4]-SSS) is interpreted as the round control field 1554A. The round control field 1554A includes a one-bit SAE field 1556 and a two-bit round operation field 1558. When the rs field 1552A contains a 0 (data transform 1552A.2), the beta field 1554 (EVEX byte 3, bits [6:4]-SSS) is interpreted as a three-bit data transform field 1554B. When U=0 and the MOD field 1642 contains 00, 01, or 10 (signifying a memory access operation), the alpha field 1552 (EVEX byte 3, bit [7]-EH) is interpreted as the eviction hint (EH) field 1552B and the beta field 1554 (EVEX byte 3, bits [6:4]-SSS) is interpreted as a three bit data manipulation field 1554C.

When U=1, the alpha field 1552 (EVEX byte 3, bit [7]-EH) is interpreted as the write mask control (Z) field 1552C. When U=1 and the MOD field 1642 contains 11 (signifying a no memory access operation), part of the beta field 1554 (EVEX byte 3, bit [4]-$S_0$) is interpreted as the RL field 1557A; when it contains a 1 (round 1557A.1) the rest of the beta field 1554 (EVEX byte 3, , bit [6-5]-$S_{2-1}$) is interpreted as the round operation field 1559A, while when the RL field 1557A contains a 0 (VSIZE 1557.A2) the rest of the beta field 1554 (EVEX byte3 , bit [6-5]-$S_{2-1}$) is interpreted as the vector length field 1559B (EVEX byte 3, , bit [6-5]-$L_{1-0}$). When U=1 and the MOD field 1642 contains 00, 01, or 10 (signifying a memory access operation), the beta field 1554 (EVEX byte 3, , bits [6:4]-SSS) is interpreted as the vector length field 1559B (EVEX byte 3, , bit [6-5]-$L_{1-0}$) and the broadcast field 1557B (EVEX byte 3, , bit [4]-B).

FIG. 17 is a block diagram of a register architecture 1700 according to one embodiment of the invention. In the embodiment shown, there are 32 vector registers 1710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1600 operates on these overlaid register file as shown in the table below.

| Adjustable Vector Length | Class | Operations | Registers |
|---|---|---|---|
| Instruction Templates that do not include the vector length field 1559B | A (FIG. 15A; U = 0) | 1510, 1515, 1525, 1530 | zmm registers (the vector length is 64 byte) |
| | B (FIG. 15B; U = 1) | 1512 | zmm registers (the vector length is 64 byte) |
| Instruction Templates that do include the vector length field 1559B | B (FIG. 15B; U = 1) | 1517, 1527 | zmm, ymm, or xmm registers (the vector length is 64-byte, 32-byte, or 16-byte) depending on the vector length field 1559B |

In other words, the vector length field 1559B selects between a maximum length and one or more other shorter lengths, where each such shorter length is half the length of the preceding length; and instructions templates without the vector length field 1559B operate on the maximum vector length. Further, in one embodiment, the class B instruction templates of the specific vector friendly instruction format 1600 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1715—in the embodiment shown, there are 8 write mask registers (k0 through k7), each 64 bits in size. In an alternate embodiment, the write mask registers 1715 are 16 bits in size. As previously described, in one embodiment of the invention, the vector mask register k0 cannot be used as a write mask; when the encoding that would normally indicate k0 is used for a write mask, it selects a hardwired write mask of 0xFFFFF, effectively disabling write masking for that instruction.

General-purpose registers 1725—in the embodiment shown, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1745, on which is aliased the MMX packed integer flat register file 1750—in the embodiment shown, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Figure 18B:
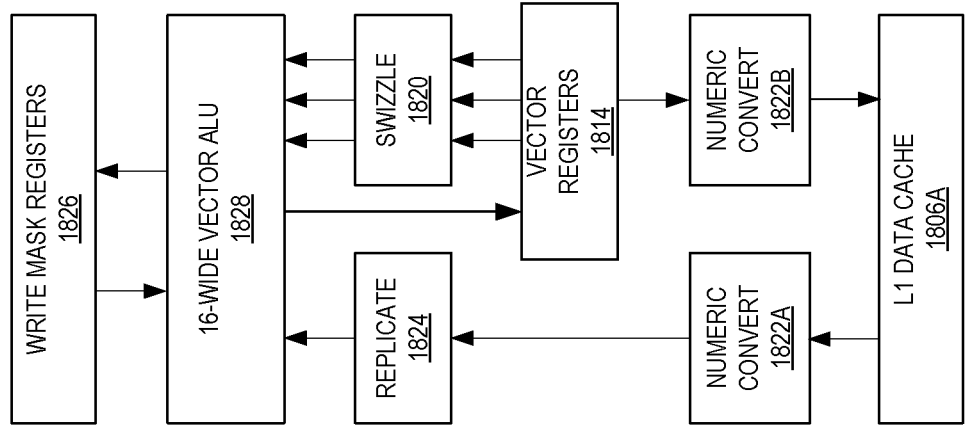
FIG. 18B is an expanded view of part of the processor core in FIG. 84A according to embodiments of the invention.
Figure 18A:
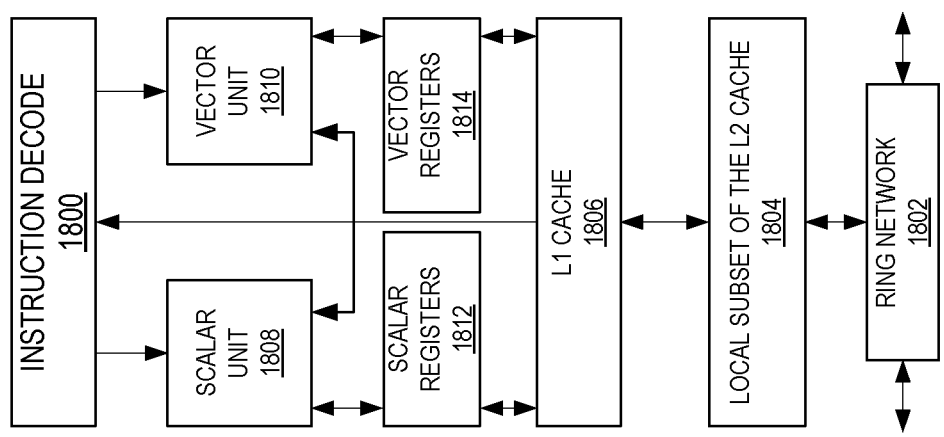
FIG. 18A is a block diagram of a single processor core, along with its connection to the on-die interconnect network and with its local subset of the Level 2 (L2) cache, according to embodiments of the invention.

FIGS. 18A-B show a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 18A is a block diagram of a single processor core, along with its connection to the on-die interconnect network 1802 and with its local subset of the Level 2 (L2) cache 1804, according to embodiments of the invention. In one embodiment, an instruction decoder 1800 supports the x86 instruction set with a packed data instruction set extension. An L1 cache 1806 allows low-latency accesses to cache memory into the scalar and vector units. While in one embodiment (to simplify the design), a scalar unit 1808 and a vector unit 1810 use separate register sets (respectively, scalar registers 1812 and vector registers 1814) and data transferred between them is written to memory and then read back in from a level 1 (L1) cache 1806, alternative embodiments of the invention may use a different approach (e.g., use a single register set or include a communication path that allow data to be transferred between the two register files without being written and read back).

The local subset of the L2 cache 1804 is part of a global L2 cache that is divided into separate local subsets, one per processor core. Each processor core has a direct access path to its own local subset of the L2 cache 1804. Data read by a processor core is stored in its L2 cache subset 1804 and can be accessed quickly, in parallel with other processor cores accessing their own local L2 cache subsets. Data written by a processor core is stored in its own L2 cache subset 1804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 18B is an expanded view of part of the processor core in FIG. 18A according to embodiments of the invention. FIG. 18B includes an L1 data cache 1806A part of the L1 cache 1804, as well as more detail regarding the vector unit 1810 and the vector registers 1814. Specifically, the vector unit 1810 is a 16-wide vector processing unit (VPU) (see the 16-wide ALU 1828), which executes one or more of integer, single-precision float, and double-precision float instructions. The VPU supports swizzling the register inputs with swizzle unit 1820, numeric conversion with numeric convert units 1822A-B, and replication with replication unit 1824 on the memory input. Write mask registers 1826 allow predicating resulting vector writes.

Exemplary Tile/Matrix Operations and Hardware

Figure 19:
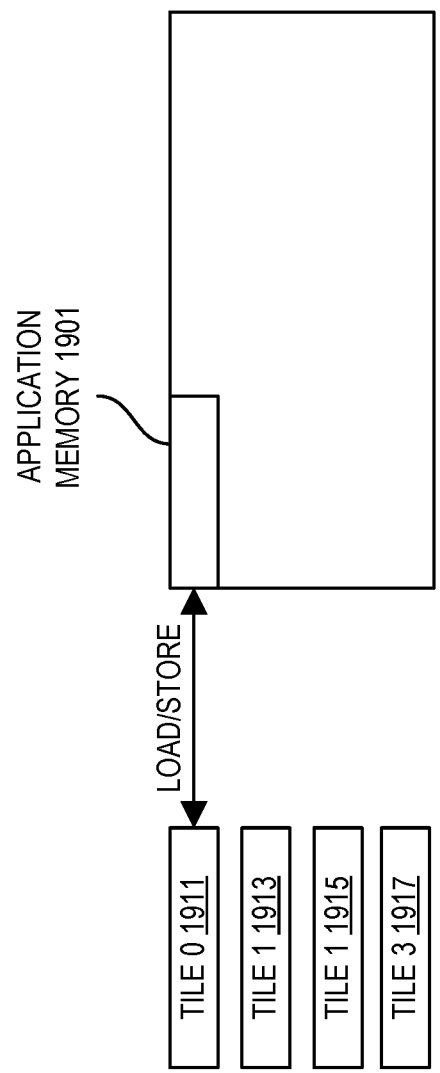
FIG. 19 illustrates an embodiment of configured tiles.

FIG. 19 illustrates an embodiment of configured tiles. As shown, there are four tiles 1911, 1913, 1915, and 1917 that are loaded from application memory 1901. In this example, tiles T0 1911 and T1 1913 have M rows and N columns with 4 element bytes (e.g., single precision data). Tiles T2 1915 and T3 1917 have M rows and N/2 columns with 8 element bytes (e.g., double precision data). As the double precision operands are twice the width of single precision, this configuration is consistent with a palette, used to provide tile options, supplying at least 4 names with total storage of 16*N*M bytes. Depending upon the instruction encoding scheme used, the number of tiles available varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

$$\text{Tile Max Rows} = \text{Architected Storage}/(\text{The Number of Palette Names} * \text{The Number of Bytes per row})$$

As such, an application can be written such that a fixed usage of names will be able to take advantage of different storage sizes across implementations.

Configuration of tiles is done using a tile configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

Figure 20:
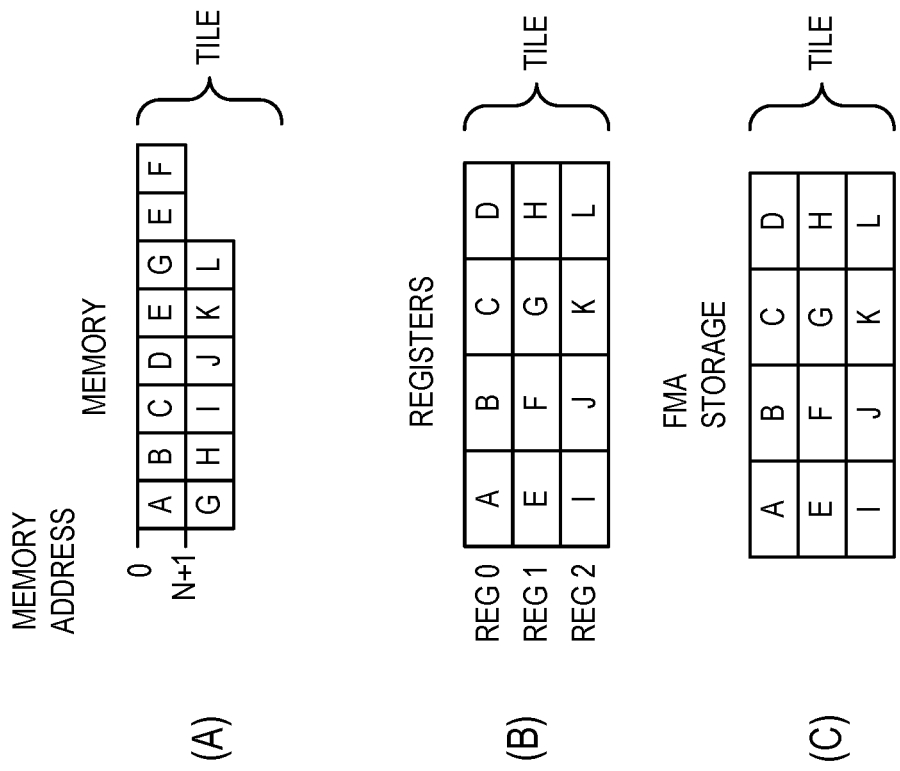
FIG. 20 illustrates several examples of matrix storage.

FIG. 20 illustrates several examples of matrix storage. In (A), a tile is stored in memory. As shown, each "row" consists of four packed data elements. To get to the next "row," a stride value is used. Note that rows may be consecutively stored in memory. Strided memory accesses allows for access of one row to then next when the tile storage does not map the underlying memory array row width.

Tile loads from memory and stores to memory are typically strided accesses from the application memory to packed rows of data. Exemplary TILELOAD and TILESTORE instructions, or other instruction references to application memory as a TILE operand in load-op instructions, are, in some embodiments, restartable to handle (up to) 2*rows of page faults, unmasked floating point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiple accumulate (FMA) circuit used in tile operations. This storage may be inside of a FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCRO bits are used in XSAVE, one for TILECONFIF metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64-byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64-byte rows, there would be 16 rows, so in this example, the last 6 rows would also be zeroed.

In some embodiments, a context restore (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data in to the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating point operations also allow for unmasked floating-point exceptions, with the masking of the exceptions controlled by a control and/or status register.

To support restarting instructions after these events, the instructions store information in the start registers detailed below.

Figure 21:
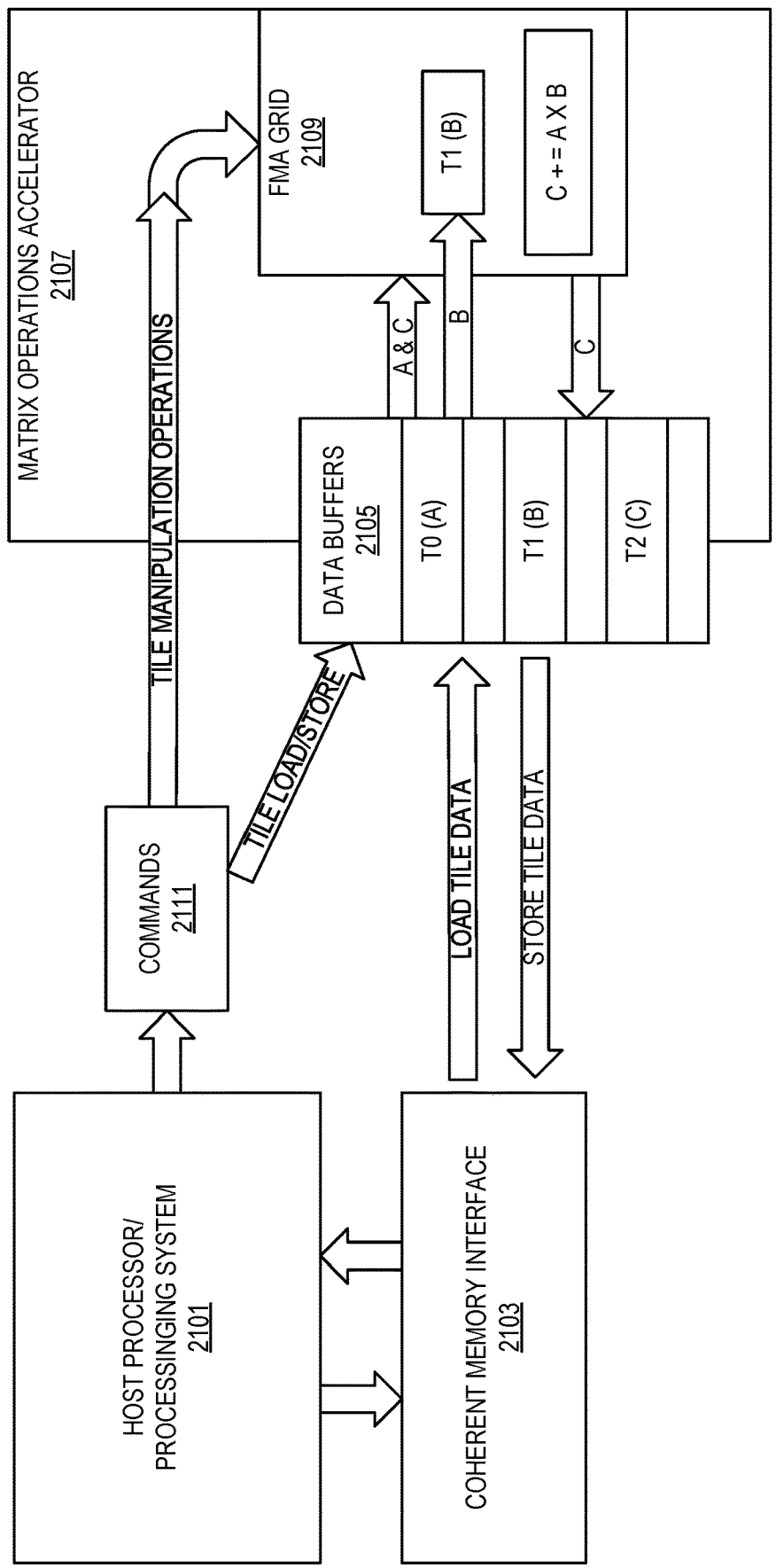
FIG. 21 illustrates an embodiment of a system utilizing a matrix (tile) operations accelerator.

FIG. 21 illustrates an embodiment of a system utilizing a matrix (tile) operations accelerator. In this illustration, a host processor/processing system 2101 communicates commands 2111 (e.g., matrix manipulation operations such as arithmetic or matrix manipulation operations, or load and store operations) to a matrix operations accelerator 2107. However, this is shown this way for discussion purposes only. As detailed later, this accelerator 2107 may be a part of a processing core. Typically, commands 2111 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 2107 to handle.

Figure 22:
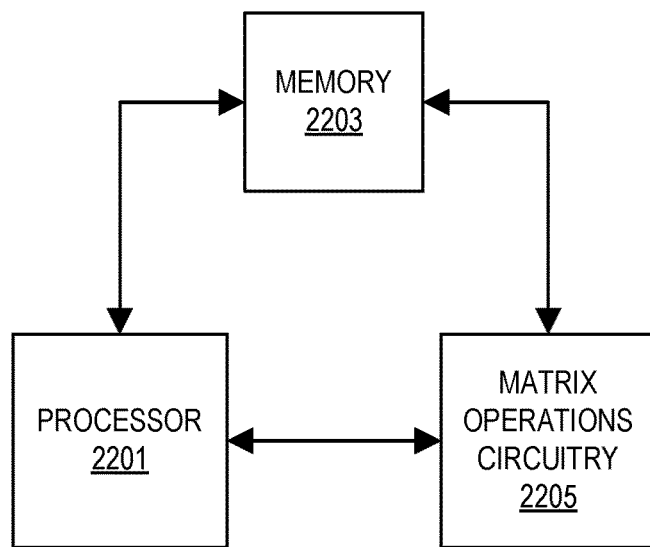
FIGS. 22 and 23 show different embodiments of how memory is shared using a matrix operations accelerator.
Figure 23:
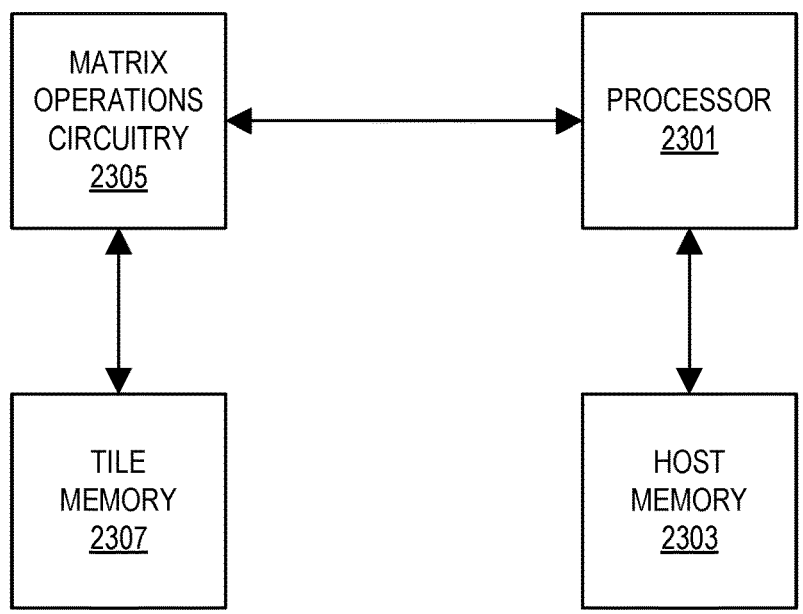

In this example, a coherent memory interface 2103 is coupled to the host processor/processing system 2101 and matrix operations accelerator 2205 such that they can share memory. FIGS. 22 and 23 show different embodiments of how memory is shared using a matrix operations accelerator. As shown in FIG. 22, the host processor 2201 and matrix operations accelerator circuitry 2205 share the same memory 2203. FIG. 23 illustrates an embodiment where the host processor 2301 and matrix operations accelerator 2305 do not share memory, but can access each other's memory. For example, processor 2301 can access tile memory 2307 and utilize its host memory 2303 as normal. Similarly, the matrix operations accelerator 2305 can access host memory 2303, but more typically uses its own memory 2307. Note these memories may be of different types.

The matrix operations accelerator 2107 includes a plurality of FMAs 2109 coupled to data buffers 2105 (in some implementations, one or more of these buffers 2105 are stored in the FMAs of the grid as shown). The data buffers 2105 buffer tiles loaded from memory and/or tiles to be stored to memory (e.g., using a tileload or tilestore instruction). Data buffers may be, for example, a plurality of registers. Typically, these FMAs are arranged as a grid of chained FMAs 2109 which are able to read and write tiles. In this example, the matrix operations accelerator 2107 is to perform a matrix multiply operation using tiles T0, T1, and T2. At least one of tiles is housed in the FMA grid 2109. In some embodiments, all tiles in an operation are stored in the FMA grid 2109. In other embodiments, only a subset are stored in the FMA grid 2109. As shown, T1 is housed and T0 and T2 are not. Note that A, B, and C refer to the matrices of these tiles which may or may not take up the entire space of the tile.

Figure 24:
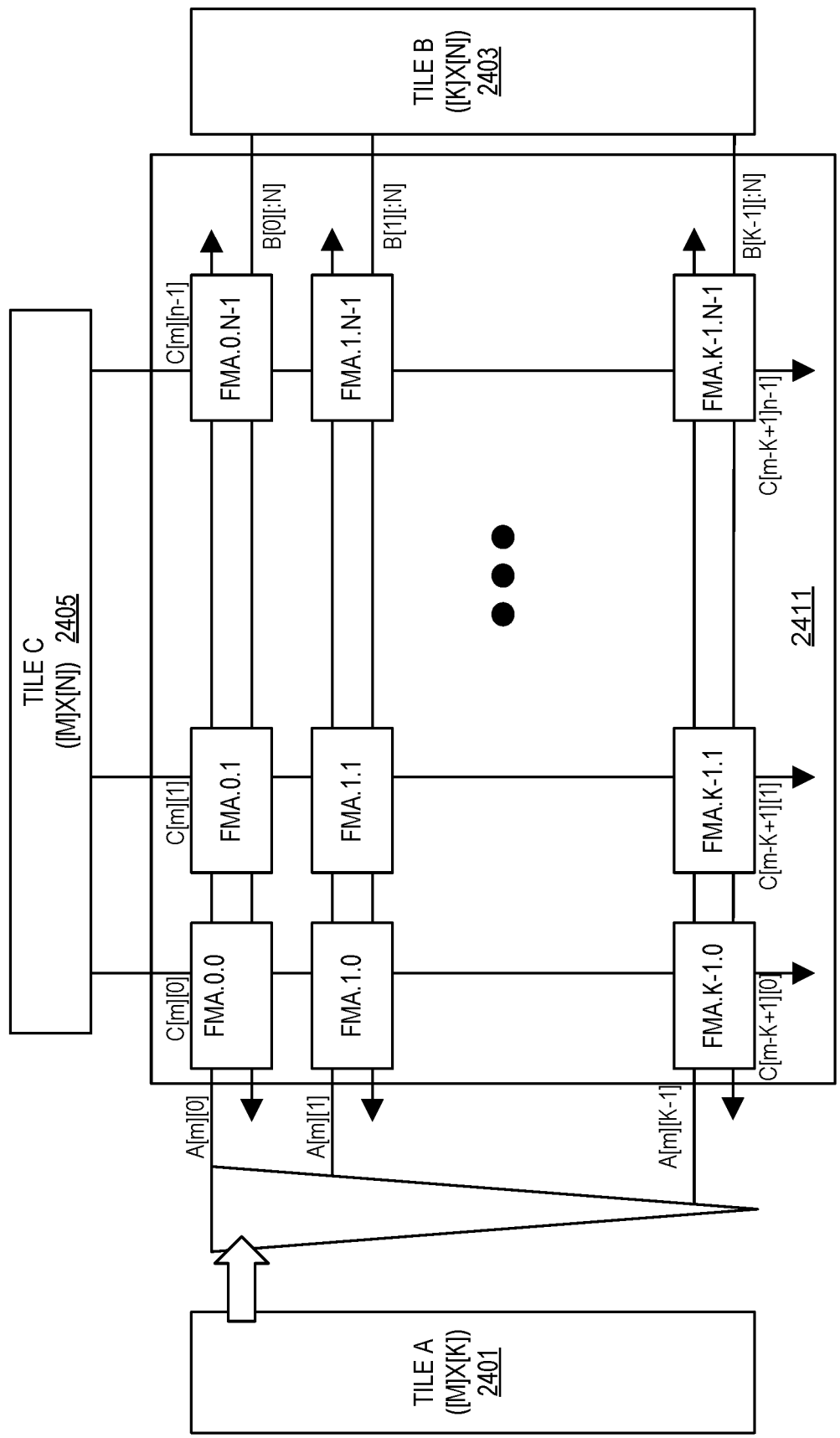
FIG. 24 illustrates an embodiment of matrix multiply accumulate operation using tiles ("TMMA").

Embodiments of the invention may use dedicated matrix operation circuitry. FIG. 24 illustrates an embodiment of matrix multiply accumulate operation using tiles ("TMMA"). The number of rows in the matrix (TILE A 2401) matches the number of serial (chained) FMAs comprising the computation's latency. An implementation is free to recirculate on a grid of smaller height, but the computation remains the same.

The source/destination vector comes from a tile of N rows (TILE C 2405) and the grid of FMAs 2411 performs N vector-matrix operations resulting in a complete instruction performing a matrix multiplication of tiles. Tile B 2403 is the other vector source and supplies "broadcast" terms to the FMAs in each stage.

In operation, in some embodiments, the elements of matrix B (stored in a tile B 2403) are spread across the rectangular grid of FMAs. Matrix B (stored in tile A 2401) has its elements of a row transposed to match up with the columnar dimension of the rectangular grid of FMAs. At each FMA in the grid, an element of A and B are multiplied and added to the incoming summand (from above in the Figure) and the outgoing sum is passed to the next row of FMAs (or the final output).

Figure 25:
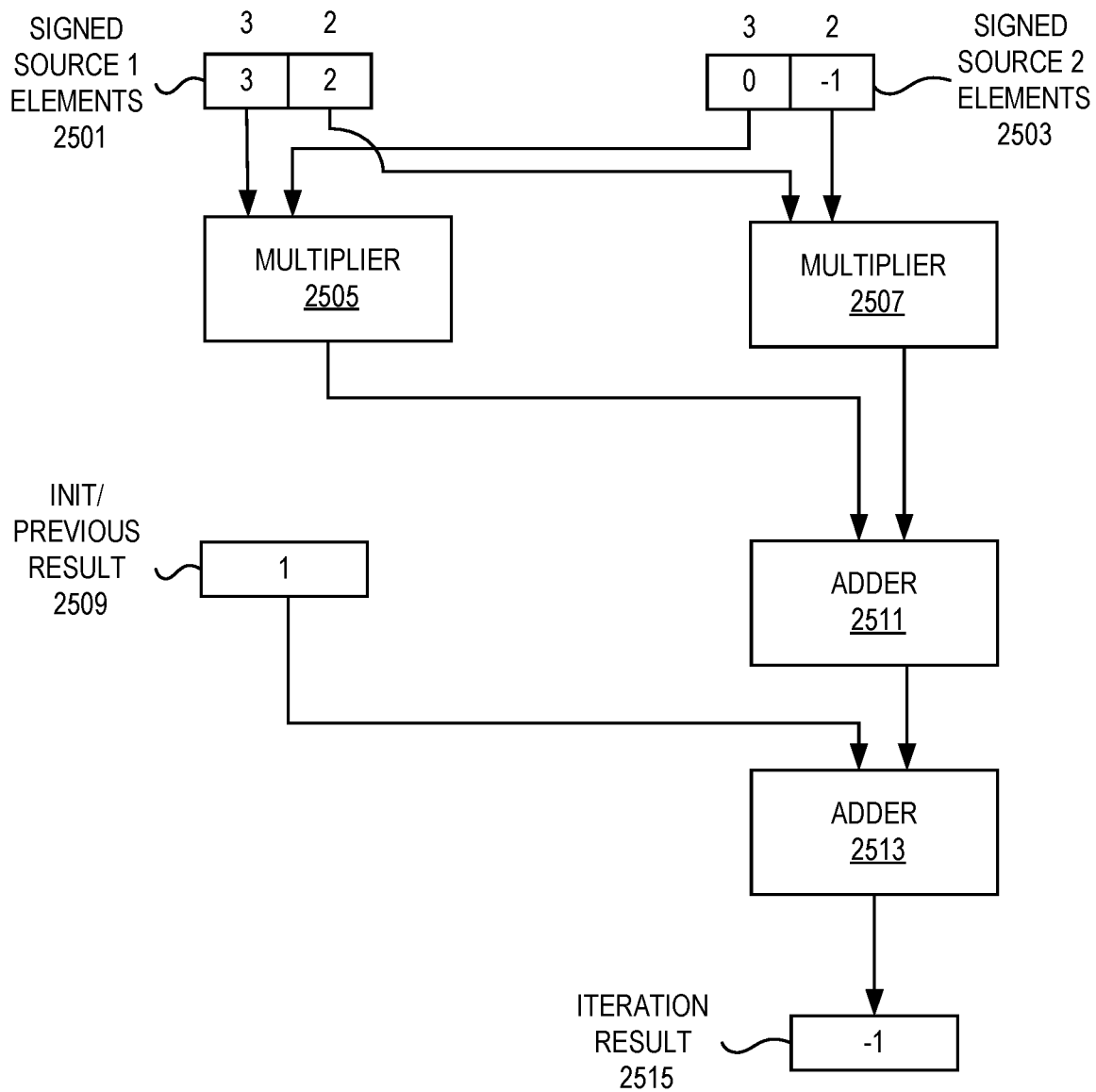
FIG. 25 illustrates an embodiment of a subset of the execution of an iteration of a chained fused multiply accumulate instruction.

FIG. 25 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2x the input data size.

A first signed source (source 1 2501) and a second signed source (source 2 2503) each have four packed data elements. Each of these packed data elements stores signed data such as floating-point data. A third signed source (source 3 2509) has two packed data elements, each of which stores signed data. The sizes of the first and second signed sources 2501 and 2503 are half that of the third signed source (initial value or previous result) 2509. For example, the first and second signed sources 2501 and 2503 could have 32-bit packed data elements (e.g., single precision floating point) while the third signed source 2509 could have 64-bit packed data elements (e.g., double precision floating point).

In this illustration, only the two most significant packed data element positions of the first and second signed sources 2501 and 2503 and the most significant packed data element position of the third signed source 2509 are shown. Of course, the other packed data element positions would also be processed.

As illustrated, packed data elements are processed in pairs. For example, the data of the most significant packed data element positions of the first and second signed sources 2501 and 2503 are multiplied using a multiplier circuit 2505, and the data from second most significant packed data element positions of the first and second signed sources 2501 and 2503 are multiplied using a multiplier circuit 2507. In some embodiments, these multiplier circuits 2505 and 2507 are reused for other packed data elements positions. In other embodiments, additional multiplier circuits are used so that the packed data elements are processed in parallel. In some contexts, parallel execution is done using lanes that are the size of the signed third source 2509. The results of each of the multiplications are added using addition circuitry 2511.

The result of the addition of the results of the multiplications is added to the data from most significant packed data element position of the signed source 3 2509 (using a different adder 2513 or the same adder 2511).

Finally, the result of the second addition is either stored into the signed destination 2515 in a packed data element position that corresponds to the packed data element position used from the signed third source 2509, or passed on to the next iteration, if there is one. In some embodiments, a writemask is applied to this storage such that if a corresponding writemask (bit) is set, the storage happens, and, if not set, the storage does not happen.

FIG. 26 shows power-of-two sized SIMD implementations wherein the accumulators use sizes that are larger than the inputs to the multipliers according to an embodiment. Note the source (to the multipliers) and accumulator values may be signed or unsigned values. For an accumulator having 2X input sizes (in other words, the accumulator input value is set to be at least twice the size of the packed data element sizes of the sources), table 2601 illustrates different configurations. For byte (int8) sized sources, the accumulator uses word or half-precision floating-point (HPFP) values that are 16-bit in size. For word (int16) sized sources, the accumulator uses 32-bit integer or single-precision floating-point (SPFP) values that are 32-bit in size. For SPFP or 32-bit integer sized sources, the accumulator uses 64-integer or double-precision floating-point (DPFP) values that are 64-bit in size.

For an accumulator having 4X sizes (in other words, the accumulator input value is set to be at least four times the size of the packed data element sizes of the sources), table 2603 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size in some embodiments.

For an accumulator having 8X input sizes (in other words, the accumulator input value is set to be at least eight times the size of the packed data element sizes of the sources), table 2605 illustrates a configuration. For byte sized sources, the accumulator uses 64-bit integer.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
decoding circuitry to decode an instruction, wherein the instruction specifies locations of a plurality of operands, values of which being in a floating-point format; and
execution circuitry to execute the decoded instruction, wherein the execution includes to:
convert the values for each operand, each value being converted into a plurality of lower precision values, and an exponent being stored for each operand,
perform arithmetic operations among the lower precision values converted from the values for the plurality of the operands, and
generate a floating-point value by converting a resulting value from the arithmetic operations into the floating-point format and store the floating-point value.

2. The processor of claim 1, wherein the conversion of the values for an operand includes to:
represent each value being converted into the plurality of lower precision values using a plurality of bits including at least a first and second number of bits,
identify the first number of bits within the plurality of bits for a first lower precision value within the plurality of lower precision values to approximate the each value, and
identify the second number of bits that are not overlapping with the first number of bits for a second lower precision value within the plurality of lower precision values to represent a remainder of the approximation of the each value using the first lower precision value,
wherein the first and second lower precision values are used to perform the arithmetic operations with lower precision values from one or more other operands.

3. The processor of claim 2, wherein the conversion of the values for the operand further includes to:
determine the exponent for the operand based on a value range of the values and the plurality of lower precision values, each of the plurality of lower precision values being an integer value, and
quantize the each value into a quantized integer value based on the value range.

4. The processor of claim 3, wherein the value range is determined based on examining all values for the operand.

5. The processor of claim 2, wherein each of the first and second lower precision values is a lower precision floating-point value.

6. The processor of claim 1, wherein the execution circuitry comprises one or more dedicated multiplier-accumulator (MAC) circuits, and the one or more dedicated MAC circuits perform integer multiply-accumulate operations.

7. The processor of claim 6, wherein each MAC circuit is a fused multiply add (FMA) circuit.

8. The processor of claim 1, wherein each operand specifies a matrix, a vector, or a multi-dimensional tensor or scalar.

9. The processor claim 1, wherein the plurality of lower precision values is determined based on a quality of service (QoS) specified by the instruction.

10. The processor of claim 1, wherein a number of the arithmetic operations to be performed is based on a quality of service (QoS) requirement specified by the instruction.

11. A method comprising:
decoding an instruction, wherein the instruction specifies locations of a plurality of operands, values of which being in a floating-point format; and
executing the decoded instruction to:
convert the values for each operand, each value being converted into a plurality of lower precision values, and an exponent being stored for each operand,
perform arithmetic operations among the lower precision values converted from the values for the plurality of the operands, and
generate a floating-point value by converting a resulting value from the arithmetic operations into the floating-point format and store the floating-point value.

12. The method of claim 11, wherein the conversion of the values for an operand includes to:
represent each value being converted into the plurality of lower precision values using a plurality of bits including at least a first and second number of bits,
identify the first number of bits within the plurality of bits for a first lower precision value within the plurality of lower precision values to approximate the each value, and
identify the second number of bits that are not overlapping with the first number of bits for a second lower precision value within the plurality of lower precision values to represent a remainder of the approximation of the each value using the first lower precision value,
wherein the first and second lower precision values are used to perform the arithmetic operations with lower precision values from one or more other operands.

13. The method of claim 12, the conversion of the values for the operand further includes to:
determine the exponent for the operand based on a value range of the values and the plurality of lower precision values, each of the plurality of lower precision values being an integer value, and
quantize the each value into an quantized integer value based on the value range.

14. The method of claim 13, wherein the value range is determined based on examining all values for the operand.

15. The method of claim 12, wherein each of the first and second lower precision values is a lower precision floating-point value.

16. The method of claim 11, wherein each operand specifies a matrix, a vector, or a multi-dimensional tensor or scalar.

17. The method of claim 11, wherein the plurality of lower precision values is determined based on a quality of service (QoS) specified by the instruction.

18. The method of claim 11, wherein a number of the arithmetic operations to be performed is based on a quality of service (QoS) requirement specified by the instruction.

19. A non-transitory machine-readable medium storing an instruction, which when executed by a processor causes the processor to perform a method, the method comprising:
- decoding an instruction, wherein the instruction specifies locations of a plurality of operands, values of which being in a floating-point format; and
- executing the decoded instruction to:
    - convert the values for each operand, each value being converted into a plurality of lower precision values, and an exponent being stored for each operand,
    - perform arithmetic operations among the lower precision values converted from the values for the plurality of the operands, and
    - generate a floating-point value by converting a resulting value from the arithmetic operations into the floating-point format and store the floating-point value.

20. The non-transitory machine-readable medium of claim 19, the plurality of lower precision values is determined based on a quality of service (QoS) specified by the instruction.

* * * * *